(12) United States Patent
Cormican et al.

(10) Patent No.: US 8,302,132 B2
(45) Date of Patent: Oct. 30, 2012

(54) MULTI-DIRECTIONAL MOVEMENT

(75) Inventors: Neil Cormican, Copenhagen (DK); Colin John Davies, Fordingbridge (GB); James Geoffrey Walker, Guildford (GB); Kevin Murray, Fordingbridge (GB); Michael Costello, Middlesex (GB); Ian R Shelton, Ringwood (GB); Michael Julian Michael Ertl, Southampton (GB)

(73) Assignee: NDS Limited, Staines (GB)

( * ) Notice: Subject to any disclaimer, the term of this patent is extended or adjusted under 35 U.S.C. 154(b) by 617 days.

(21) Appl. No.: 12/518,491

(22) PCT Filed: Sep. 25, 2007

(86) PCT No.: PCT/GB2007/003643
§ 371 (c)(1),
(2), (4) Date: Oct. 7, 2009

(87) PCT Pub. No.: WO2009/040491
PCT Pub. Date: Apr. 2, 2009

(65) Prior Publication Data
US 2010/0043028 A1 Feb. 18, 2010

(51) Int. Cl.
*G06F 3/00* (2006.01)
*G06F 13/00* (2006.01)
*H04N 5/445* (2006.01)
(52) U.S. Cl. ............................ 725/52; 725/138; 725/144
(58) Field of Classification Search .................... 725/39, 725/43, 52, 138, 144
See application file for complete search history.

(56) References Cited

U.S. PATENT DOCUMENTS

| | | | |
|---|---|---|---|
| 5,523,796 A | 6/1996 | Marshall et al. |
| 5,623,613 A | 4/1997 | Rowe et al. |
| 5,880,722 A | 3/1999 | Brewer et al. |
| 5,933,140 A | 8/1999 | Strahorn et al. |
| 6,239,794 B1 | 5/2001 | Yuen et al. |
| 6,240,555 B1 | 5/2001 | Shoff et al. |
| 6,275,989 B1 | 8/2001 | Broadwin et al. |
| 7,096,428 B2 | 8/2006 | Foote et al. |

(Continued)

FOREIGN PATENT DOCUMENTS
EP 1 024 661 A2 8/2000
(Continued)

OTHER PUBLICATIONS

Official Communication of Sep. 29, 2010 in European Application 07804388.2.

(Continued)

*Primary Examiner* — Ngoc Vu
(74) *Attorney, Agent, or Firm* — Ladas & Parry LLP

(57) ABSTRACT

A system for preparing data and video sequences to enable a viewer to scroll content in a plurality of directions including a first and second direction, the content including at least one element in motion, the system including a video sequence preparation module to prepare the video sequences including a first and second video sequence, each video sequence including still images, each still image including at least part of the content, at least some of the still images including the at least one element, the video sequences being prepared such that playing the first and second video sequence effects scrolling the content in the first and second direction, respectively, and a switchover determination module to prepare the data including corresponding switchover points in the video sequences for switching between the video sequences and therefore for switching the direction of scrolling by the viewer. Related apparatus and methods are also described.

25 Claims, 16 Drawing Sheets

U.S. PATENT DOCUMENTS

| | | |
|---|---|---|
| 8,019,195 B2 * | 9/2011 | Shiiyama .................. 386/241 |
| 2004/0003399 A1 | 1/2004 | Cooper et al. |
| 2005/0097603 A1 | 5/2005 | Kikinis |
| 2006/0020989 A1 | 1/2006 | Brun |
| 2008/0024444 A1 * | 1/2008 | Abe et al. .................. 345/157 |
| 2009/0249393 A1 * | 10/2009 | Shelton et al. ............ 725/39 |

FOREIGN PATENT DOCUMENTS

| | | |
|---|---|---|
| WO | 97/49242 | 12/1997 |
| WO | 00/05888 | 2/2000 |
| WO | 02/11517 | 2/2002 |
| WO | 2004/072935 A2 | 8/2004 |
| WO | 2007/000559 A1 | 1/2007 |
| WO | 2007/015047 A2 | 2/2007 |

OTHER PUBLICATIONS

Summons to Oral Proceedings Issued by EPO in European Application 07804388.2 on Mar. 27, 2012.

* cited by examiner

FIG. 13

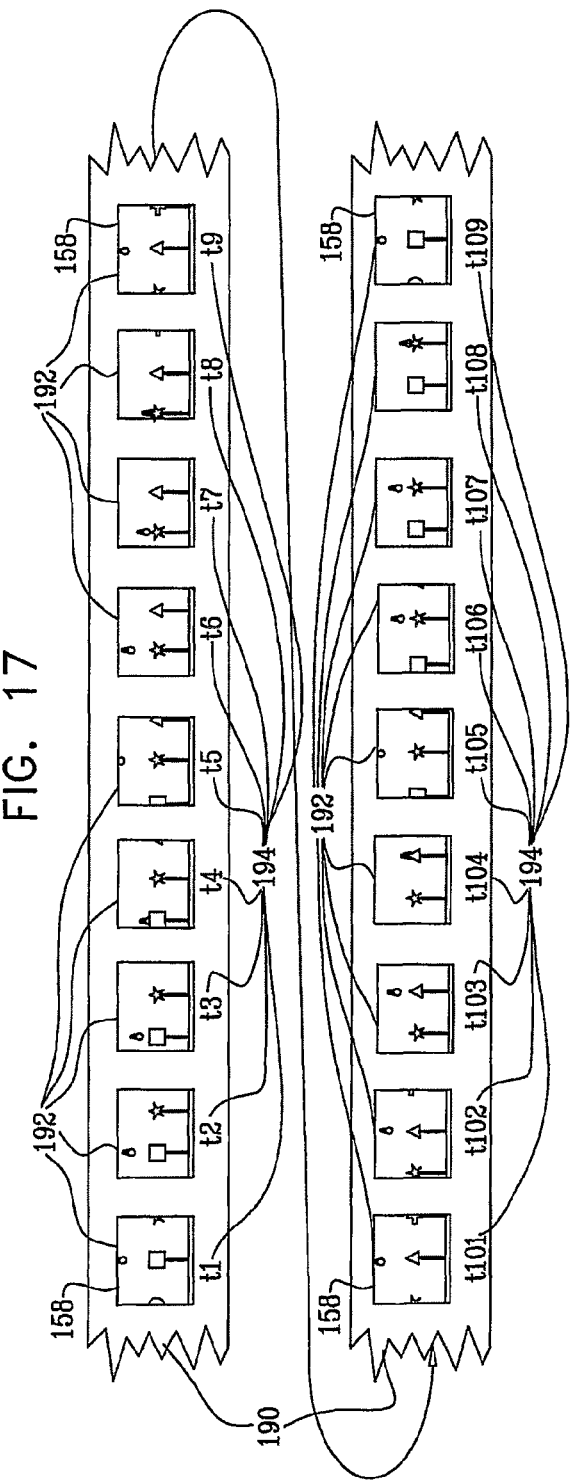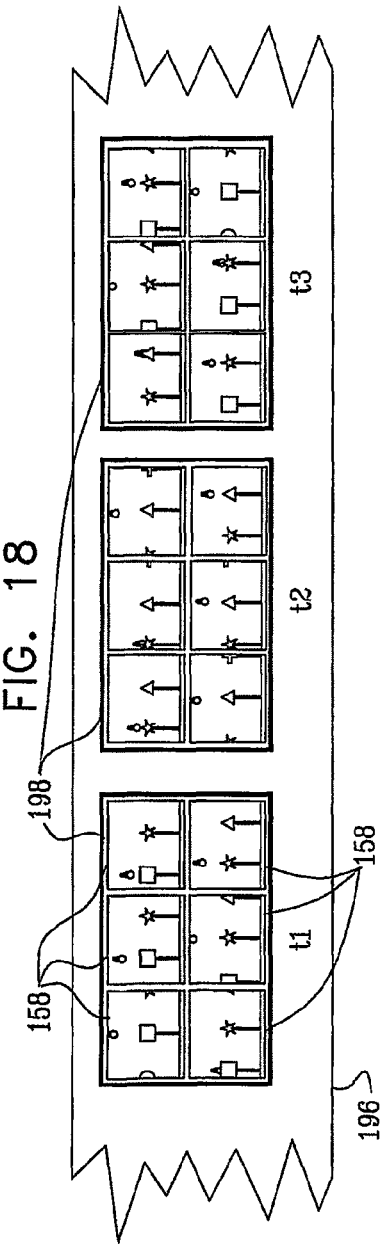

MULTI-DIRECTIONAL MOVEMENT

FIELD OF THE INVENTION

The present invention relates to video enabled user controlled multi-directional movement through content, and in particular, to video enabled user controlled scrolling of content.

The present application is a 35 USC §371 application of PCT/GB2007/003643, filed on 25 Sep. 2007 and entitled "Multi-directional movement", which was published on 2 Apr. 2009 in the English language with International Publication Number WO 2009/040491.

BACKGROUND OF THE INVENTION

The following references are believed to represent the state of the art:

US Published Patent Application 2004/0003399 of Cooper;
US Published Patent Application 2005/0097603 of Kikinis;
US Published Patent Application 2006/0020989 of Brun;
U.S. Pat. No. 5,523,796 to Marshall, et al.;
U.S. Pat. No. 5,623,613 to Rowe, et al.;
U.S. Pat. No. 5,880,722 to Brewer, et al.;
U.S. Pat. No. 5,933,140 to Strahorn, et al.;
U.S. Pat. No. 6,239,794 to Yuen, et al.;
U.S. Pat. No. 6,240,555 to Shoff, et al.;
U.S. Pat. No. 7,096,428 to Foote, et al.;
European Published Patent Application EP 1 024 661 of Hughes Electronics Corporation;
PCT Published Patent Application WO 97/49242 of Starsight Telecast Incorporated;
PCT Published Patent Application WO 2004/072935 of NDS Limited;
PCT Published Patent Application WO 2007/000559 of NDS Limited; and
PCT Published Patent Application WO 2007/015047 of NDS Limited.

The disclosures of all references mentioned above and throughout the present specification, as well as the disclosures of all references mentioned in those references, are hereby incorporated herein by reference.

SUMMARY OF THE INVENTION

The present invention seeks to provide an improved system and method for video enabled user controlled multi-directional movement through content, and in particular, to video enabled user controlled scrolling of content.

There is thus provided in accordance with a preferred embodiment of the present invention a system for preparing data and a plurality of video sequences to enable a viewer to scroll content in a plurality of directions including a first direction and a second direction, the content including at least one element in motion, the system including a plurality of operationally connected modules including a video sequence preparation module to prepare the video sequences including a first video sequence and a second video sequence, each of the video sequences including a plurality of still images, each of the still images including at least part of the content, at least some of the still images including the at least one element, the video sequences being prepared such that playing the first video sequence and the second video sequence effects scrolling the content in the first direction and the second direction, respectively, and a switchover determination module to prepare the data including a plurality of corresponding switchover points in the video sequences for switching between the video sequences and therefore for switching the direction of scrolling by the viewer.

Further in accordance with a preferred embodiment of the present invention the video sequences and the switchover points are prepared such that even during the switching of the direction of scrolling, the content as viewed by the viewer appears to be continuous.

Still further in accordance with a preferred embodiment of the present invention the video sequences and the switchover points are prepared such that, whether the scrolling is in the first direction or the second direction, the motion of the at least one element as viewed by the viewer appears to be the same.

Additionally in accordance with a preferred embodiment of the present invention the switchover determination module is operative to define the switchover points a repetition of the motion of the at least one element.

Moreover in accordance with a preferred embodiment of the present invention the video sequences and the switchover points are prepared such that even when the scrolling is paused, the at least one element appears to be in motion.

Further in accordance with a preferred embodiment of the present invention the content includes at least part of a program guide, the content including a plurality of program items, the switchover determination module being operative to define the switchover points a plurality of scroll latch points, the scroll latch points being where the scrolling of the content comes to rest such that a whole one of the program items is at the top of the program items as viewed by the viewer.

Still further in accordance with a preferred embodiment of the present invention the at least one element in motion is an animation or preview for one of the program items.

Additionally in accordance with a preferred embodiment of the present invention the video sequence preparation module is operative to prepare a video stream including a plurality of video frames associated with a plurality of timecodes, each of the video frames including one of the still images of the video sequences, the switchover determination module being operative to define the switchover points with reference to the timecodes of the video frames.

Moreover in accordance with a preferred embodiment of the present invention the video sequence preparation module is operative to prepare a video stream including a plurality of video frames, each of the video frames including more than one of the still images.

Further in accordance with a preferred embodiment of the present invention the video sequence preparation module is operative to prepare the video sequences such that some of the still images of the first video sequence are the same as some of the still images of the second video sequence, the switchover determination module being operative to define the switchover points being at, or next to, the still images common to the first video sequence and the second video sequence.

There is also provided in accordance with still another preferred embodiment of the present invention a system for enabling a viewer to scroll content in a plurality of directions including a first direction and a second direction, the content including at least one element in motion, the system including a plurality of operationally connected modules including a video receive module to receive a plurality of video sequences including a first video sequence and a second video sequence, each of the video sequences including a plurality of still images, each of the still images including at least part of the content, at least some of the still images including the at least one element, the first video sequence being associated with scrolling in the first direction, the second video sequence being associated with scrolling in the second direction, a switchover point receive module to receive a plurality of corresponding switchover points in the video sequences for switching between the video sequences and therefore for switching the direction of scrolling, a command receive module to receive a control command from the viewer to scroll in the first direction, a rendering module to play the first video sequence upon receipt of the control command, the command receive module being operative to receive another control command from the viewer to scroll in the second direction, and a switchover module to find a next one of the switchover points for exiting the first video sequence upon receipt of the other control command, find the corresponding one of the switchover points in the second video sequence, and instruct the rendering module to switch from playing the first video sequence to the second video sequence based on the found switchover points.

Still further in accordance with a preferred embodiment of the present invention the video sequences are prepared and the switchover points are defined such that even during the switching of the direction of scrolling, the content as viewed by the viewer appears to be continuous.

Additionally in accordance with a preferred embodiment of the present invention the video sequences and the switchover points are prepared such that, whether the scrolling is in the first direction or the second direction, the motion of the at least one element as viewed by the viewer appears to be the same.

Moreover in accordance with a preferred embodiment of the present invention the switchover points are defined a repetition of the motion of the at least one element.

Further in accordance with a preferred embodiment of the present invention the video sequences and the switchover points are prepared such that even when the scrolling is paused, the at least one element appears to be in motion.

Still further in accordance with a preferred embodiment of the present invention the content includes at least part of a program guide, the content including a plurality of program items, the switchover points being defined a plurality of scroll latch points, the scroll latch points being where the scrolling of the content comes to rest such that a whole one of the program items is at the top of the program items viewed by the viewer.

Additionally in accordance with a preferred embodiment of the present invention the at least one element in motion is an animation or preview associates with one of the program items.

Moreover in accordance with a preferred embodiment of the present invention the video receive module is operative to receive a video stream including a plurality of video frames associated with a plurality of timecodes, each of the video frames including one of the still images of the video sequences, the switchover points being defined with reference to the timecodes of the video frames.

Further in accordance with a preferred embodiment of the present invention the video receive module is operative to receive a video stream including a plurality of video frames, each of the video frames including more than one of the still images, the rendering module being operative to upsample the still images upon rendering.

Still further in accordance with a preferred embodiment of the present invention some of the still images of the first video sequence are the same as some of the still images of the second video sequence, the switchover points being at, or next to, the still images common to the first video sequence and the second video sequence.

There is also provided in accordance with still another preferred embodiment of the present invention a method for preparing data and a plurality of video sequences to enable a viewer to scroll content in a plurality of directions including a first direction and a second direction, the content including at least one element in motion, the method including preparing the video sequences including a first video sequence and a second video sequence, each of the video sequences including a plurality of still images, each of the still images including at least part of the content, at least some of the still images including the at least one element, the video sequences being prepared such that playing the first video sequence and the second video sequence effects scrolling the content in the first direction and the second direction, respectively, and preparing the data including a plurality of corresponding switchover points in the video sequences for switching between the video sequences and therefore for switching the direction of scrolling by the viewer.

There is also provided in accordance with still another preferred embodiment of the present invention a method for enabling a viewer to scroll content in a plurality of directions including a first direction and a second direction, the content including at least one element in motion, the method including receiving a plurality of video sequences including a first video sequence and a second video sequence, each of the video sequences including a plurality of still images, each of the still images including at least part of the content, at least some of the still images including the at least one element, the first video sequence being associated with scrolling in the first direction, the second video sequence being associated with scrolling in the second direction, receiving a plurality of corresponding switchover points in the video sequences for switching between the video sequences and therefore for switching the direction of scrolling, receiving a control command from the viewer to scroll in the first direction, playing the first video sequence upon receipt of the control command, receiving another control command from the viewer to scroll in the second direction, finding a next one of the switchover points for exiting the first video sequence upon receipt of the other control command, finding the corresponding one of the switchover points in the second video sequence, and instructing the rendering module to switch from playing the first video sequence to the second video sequence based on the found switchover points.

There is also provided in accordance with still another preferred embodiment of the present invention a program guide generation system to generate a program guide for rendering by a rendering device, the system including a plurality of operationally connected modules including a receive module to receive a list including a plurality of program items, and a video sequence preparation module to prepare a video sequence including a plurality of video frames, each of the video frames including at least one of the program items, the video frames being generated such that playing the video sequence by the rendering device generates a video output showing scrolling of the program items.

Additionally in accordance with a preferred embodiment of the present invention the video sequence preparation module is operative to prepare the video sequence such that playing the video sequence in a forward direction by the rendering device generates the video output showing scrolling of the program items in a first direction, and playing the video sequence in a reverse direction by the rendering device generates the video output showing scrolling of the program items in a second direction.

Moreover in accordance with a preferred embodiment of the present invention the program guide includes a pictorial representation of one of the program items.

Further in accordance with a preferred embodiment of the present invention the program guide includes at least one element in motion.

Still further in accordance with a preferred embodiment of the present invention, the system includes a metadata generator to generate metadata for use in at least one of navigation of the program guide, and disposing an indicator showing that one of the program items has been booked.

Additionally in accordance with a preferred embodiment of the present invention the metadata indicates the video frames where a whole one of the program items is at the top of the program items.

Moreover in accordance with a preferred embodiment of the present invention the metadata indicates a height of each of the program items.

Further in accordance with a preferred embodiment of the present invention the program guide includes a plurality of channels, the metadata linking the channels to the video frames.

Still further in accordance with a preferred embodiment of the present invention the program guide includes a plurality of channels, the video sequence being associated with the program items of one of the channels, the video sequence preparation module being operative to prepare a plurality of other video sequences, the other video sequences being uniquely associated with other ones of the channels, the metadata linking the channels to the video sequence and the other video sequences.

Additionally in accordance with a preferred embodiment of the present invention the program guide includes a plurality of days, the metadata linking the days to the video frames.

Moreover in accordance with a preferred embodiment of the present invention the program items are associated with a plurality of program times, the metadata linking the program times to the video frames.

There is also provided in accordance with still another preferred embodiment of the present invention a program guide system to generate a program guide including a plurality of program items for navigation by a viewer, the system including a plurality of operationally connected modules including a video receive module to receive a video sequence including a plurality of video frames, each of the video frames including at least one of the program items such that playing the video sequence generates a video output showing scrolling of the program items, a command receive module to receive a control command from the viewer to scroll the program items, and a rendering module to play the video sequence thereby generating the video output showing the scrolling of the program items.

Further in accordance with a preferred embodiment of the present invention the command receive module is operative to receive a first scrolling command to scroll in a first direction and a second scrolling command to scroll in a second direction, and the rendering module is operative to on receipt of the first scrolling command, to play the video sequence in a forward direction thereby generating the video output showing scrolling of the program items in the first direction, and on receipt of the second scrolling command, to play the video sequence in a reverse direction thereby generating the video output showing scrolling of the program items in the second direction.

Still further in accordance with a preferred embodiment of the present invention the program guide includes a pictorial representation of one of the program items.

Additionally in accordance with a preferred embodiment of the present invention the program guide includes at least one element in motion.

Moreover in accordance with a preferred embodiment of the present invention the scrolling of the program items appears to the viewer as smooth scrolling.

Further in accordance with a preferred embodiment of the present invention the rendering module is operative to adjust a play speed of the video sequence during the scrolling such that the scrolling accelerates after a start of the scrolling.

Still further in accordance with a preferred embodiment of the present invention the rendering module is operative to adjust the play speed of the video sequence during an end of the scrolling such that the scrolling decelerates to a stop.

Additionally in accordance with a preferred embodiment of the present invention, the system includes a metadata receiver to receive metadata for use in at least one of navigation of the program guide, and disposing an indicator showing that one of the program items has been booked.

Moreover in accordance with a preferred embodiment of the present invention the metadata indicates a plurality of scroll latch points being the video frames where a whole one of the program items is at the top of the program items, the rendering module being operative to bring the scrolling to rest at the scroll latch points.

Further in accordance with a preferred embodiment of the present invention the metadata indicates a height of each of the program items, the system further including an on-screen display module to dispose an indicator showing that one of the program items has been booked, the position of the indicator being based on the height of at least one of the program items.

Still further in accordance with a preferred embodiment of the present invention the program guide includes a plurality of channels, the command receive module being operative to receive a channel change command from the viewer to select a new one of the channels for viewing in the program guide, the metadata linking the channels to the video frames, the rendering module being operative to play the video sequence from one of the video frames indicated by the metadata as being associated with the new channel on receipt of the channel change command.

Additionally in accordance with a preferred embodiment of the present invention the program guide includes a plurality of channels, the video sequence being associated with the program items of one of the channels, the video receive module being operative to receive a plurality of other video sequences, the other video sequences being uniquely associated with other ones of the channels, the metadata lining the channels to the video sequence and the other video sequences, the command receive module being operative to receive a channel change command from the viewer to select a new one of the channels for viewing in the program guide, the rendering module being operative to start playing one of the other video sequences indicated by the metadata as being associated with the new channel on receipt of the channel change command.

Moreover in accordance with a preferred embodiment of the present invention the program guide includes a plurality of days, the metadata linking the days to the video frames, the command receive module being operative to receive a day change command from the viewer to select a new day of the days for viewing in the program guide, the rendering module being operative to play the video sequence from one of the video frames indicated by the metadata as being associated with the new day on receipt of the day change command.

Further in accordance with a preferred embodiment of the present invention the program items are associated with a plurality of program times, the metadata linking the program times to the video frames.

There is also provided in accordance with still another preferred embodiment of the present invention a method to generate a program guide for rendering by a rendering device, the method including receiving a list including a plurality of program items, and preparing a video sequence including a plurality of video frames, each of the video frames including at least one of the program items, the video frames being generated such that playing the video sequence by the rendering device generates a video output showing scrolling of the program items.

There is also provided in accordance with still another preferred embodiment of the present invention a method to generate a program guide including a plurality of program items for navigation by a viewer, the method including receiving a video sequence including a plurality of video frames, each of the video frames including at least one of the program items such that playing the video sequence generates a video output showing scrolling of the program items, receiving a control command from the viewer to scroll the program items, and playing the video sequence thereby generating the video output showing the scrolling of the program items.

BRIEF DESCRIPTION OF THE DRAWINGS

The present invention will be understood and appreciated more fully from the following detailed description, taken in conjunction with the drawings in which:

FIG. 13 is a partly pictorial, partly block diagram view showing rendering of a video sequence including an element in motion by the receiver of FIG. 10;

FIG. 17 is a view of the video sequences of FIG. 16 disposed in a video stream; and FIG. 18 is a view of the video sequences of FIG. 16 being down sampled prior to being disposed into a video stream.

DETAILED DESCRIPTION OF A PREFERRED EMBODIMENT

Persons skilled in the art will appreciate that, throughout the present application, a set-top box is used by way of example only, and that the present invention is not limited to a particular type of video rendering device, but rather includes any suitable device for example, but not limited to, a suitably configured computing device including a mobile telephone.

Similarly, persons skilled in the art will appreciate that, throughout the present application, a Headend is used by way of example only, and that the present invention is not limited to a particular type of content preparation apparatus, but rather includes any suitable device.

Figure 1:
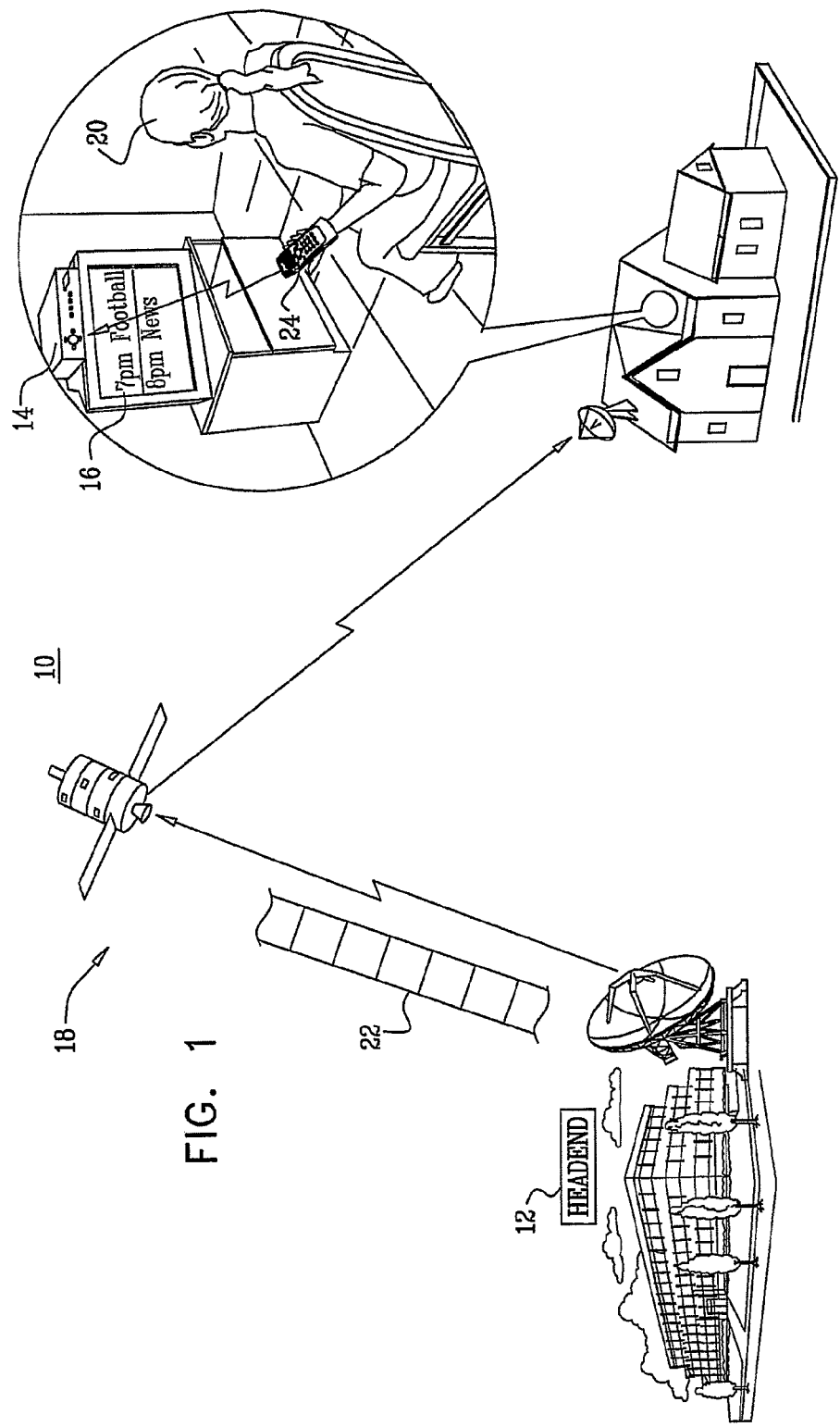
FIG. 1 is a partly pictorial, partly block diagram view of a program guide system constructed and operative in accordance with a preferred embodiment of the present invention.

Reference is now made to FIG. 1, which is a partly pictorial, partly block diagram view of a program guide system 10 constructed and operative in accordance with a preferred embodiment of the present invention.

The program guide system 10 is typically implemented in an environment including a Headend 12 and a plurality of receivers 14 (only one shown for the sake of clarity). The receivers 14 are typically personal video recorders PVRs (set-top boxes (STBs) with a hard disk for recording content). Video and data are generally broadcast from the Headend 12 to the receivers 14 using a satellite link 18. However, it will be appreciated by those ordinarily skilled in the art that any suitable communication link may be used to broadcast video and data from the Headend 12 to the receivers 14, for example, but not limited to, a cable, terrestrial or Internet Protocol (IP) communication link. It will also be appreciated by those ordinarily skilled in the art that the program guide system 10 may be implemented in any other suitable environment.

By way of introduction, the program guide system 10 is generally operative to produce a magazine style program guide 16 in the form of a video clip with metadata. The video clip and metadata are typically produced at the Headend 12. The video clip and metadata are then generally "pushed", in a transport stream 22, by the Headend 12 via the satellite link 18 to the receivers 14. The video clip is preferably automatically recorded by the receivers 14 without viewer intervention onto the hard disk (not shown) along with the metadata. The metadata typically associates individual programs with timecodes in the video clip. Metadata is described in more detail with reference to FIG. 9. The video clip is then generally rendered by the receivers 14 yielding the program guide 16.

As a useful analogy, imagine a television guide paper magazine (one-sided edition) complete with program listings, articles and reviews. Remove the staples and lay the pages out in a tall column. Now capture a video clip moving the camera from the top page to the last page. Playing the video clip scrolls from the top of the first page of the magazine to the bottom of the last page of the magazine.

On entering the program guide 16, a viewer 20 is typically taken to a paused playback of the video clip. Pressing a down key (not shown) on a remote control 24 typically plays the video clip forwards (scrolling down the program guide 16) and pressing an up key (not shown) typically plays the video clip in reverse (scrolling up the program guide 16). Letting go of the remote keys generally causes scrolling to stop by leaving the video clip in pause mode. The program guide 16 also preferably includes a plurality of channels and a plurality of days for each channel. Pressing other remote control keys (not shown) preferably allows the viewer 20 to jump to specific timecodes in the video clip in order to allow jumping to new sections of the video clip associated with programming for the next 24 hours, the next channel, or jump over reviews, by way of example only.

Figure 2:
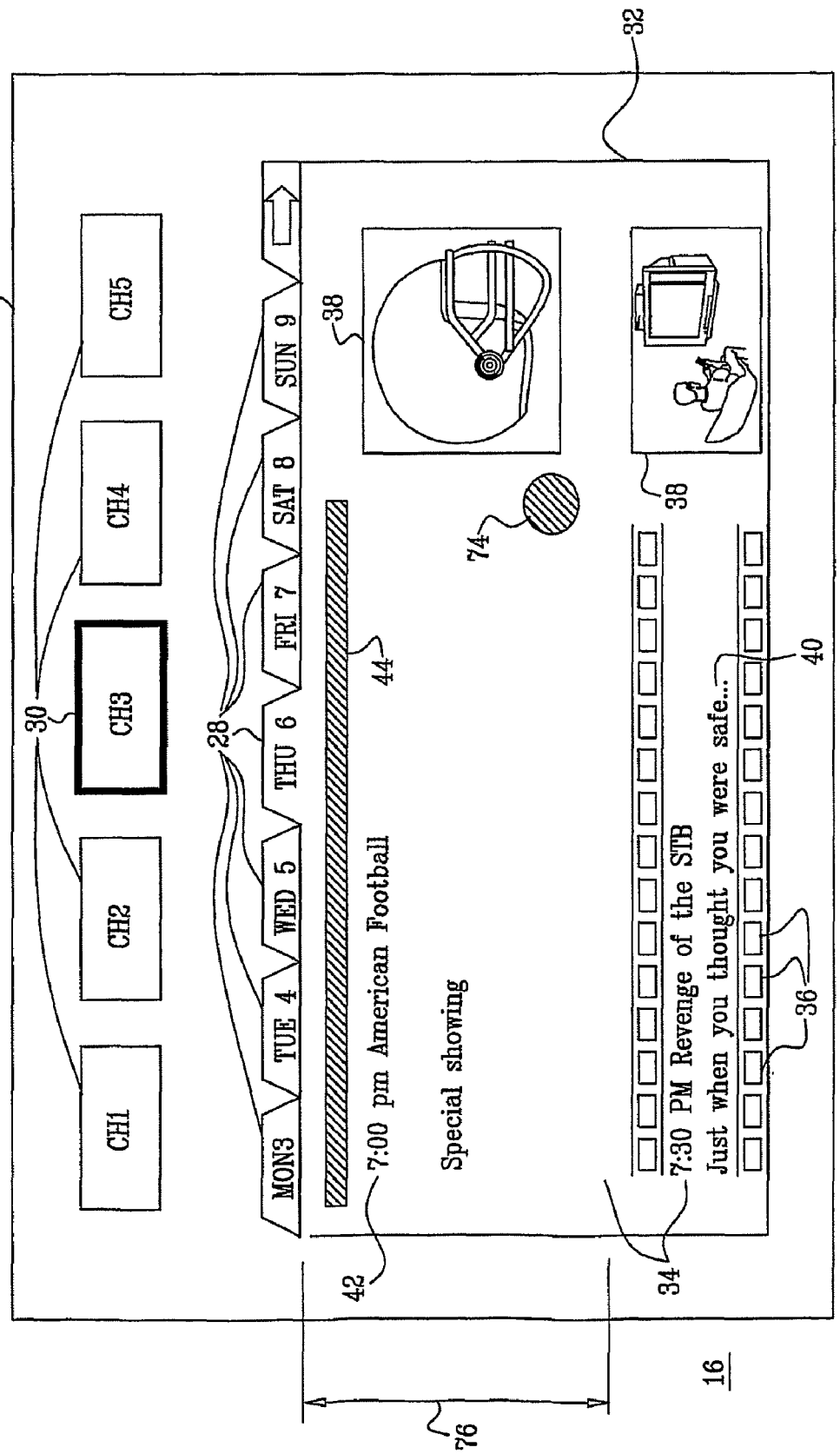
FIG. 2 is a view of a program guide screen produced using the system of FIG. 1.

Reference is now made to FIG. 2, which is a view of a program guide screen 26 produced using the system 10 of FIG. 1.

It is important to note that in the simple analogy given in FIG. 1, whereby the television guide paper magazine is converted into the video clip, the viewer 20 (FIG. 1) would see the whole screen scrolling as the viewer 20 issued scrolling commands from the remote control 24 (FIG. 1). In a preferred implementation of the program guide 16 only a portion of the program guide screen 26 scrolls while the remaining portion of the program guide screen 26 remains fairly static. The program guide screen 26 preferably includes a scrolling window 32 where a plurality of program items 34 may be scrolled vertically for navigation by the viewer 20 (FIG. 1). The program guide screen 26 also preferably includes a plurality of tabs 28 and logos 30 to indicate the day and channel of the programs shown in the program guide 16. The tabs 28 and logos 30 generally do not scroll vertically with the program items 34. The tabs 28 and logos 30 typically change as the day and channel update, respectively. The tabs 28 and logos 30 generally scroll horizontally at date or channel boundaries, whilst the programs items 34 and images associated with the program items 34 scroll vertically. The tabs 28 and logos 30 typically slide such that the current day or channel remains in the middle of the program guide screen 26.

The program guide 16 is preferably operative such that the viewer 20 experiences a highly responsive navigational tool with images and text smoothly scrolling.

The program guide 16 is typically prepared to include 10 days of programming, by way of example only.

Preferably, movies included in the program items 34 are surrounded above and below by a plurality of sprockets 36 in order to make the movies easily identifiable and visually more interesting. Movies and other program items 34 in the program guide 16 may include a pictorial representation 38 and/or a synopsis 40.

Sports programs may be colored green (like grass) to allow rapid searching.

A top program item 42 in the scroll window 32 may be highlighted, for example using an on-screen display 44, when scrolling stops.

Figure 3:
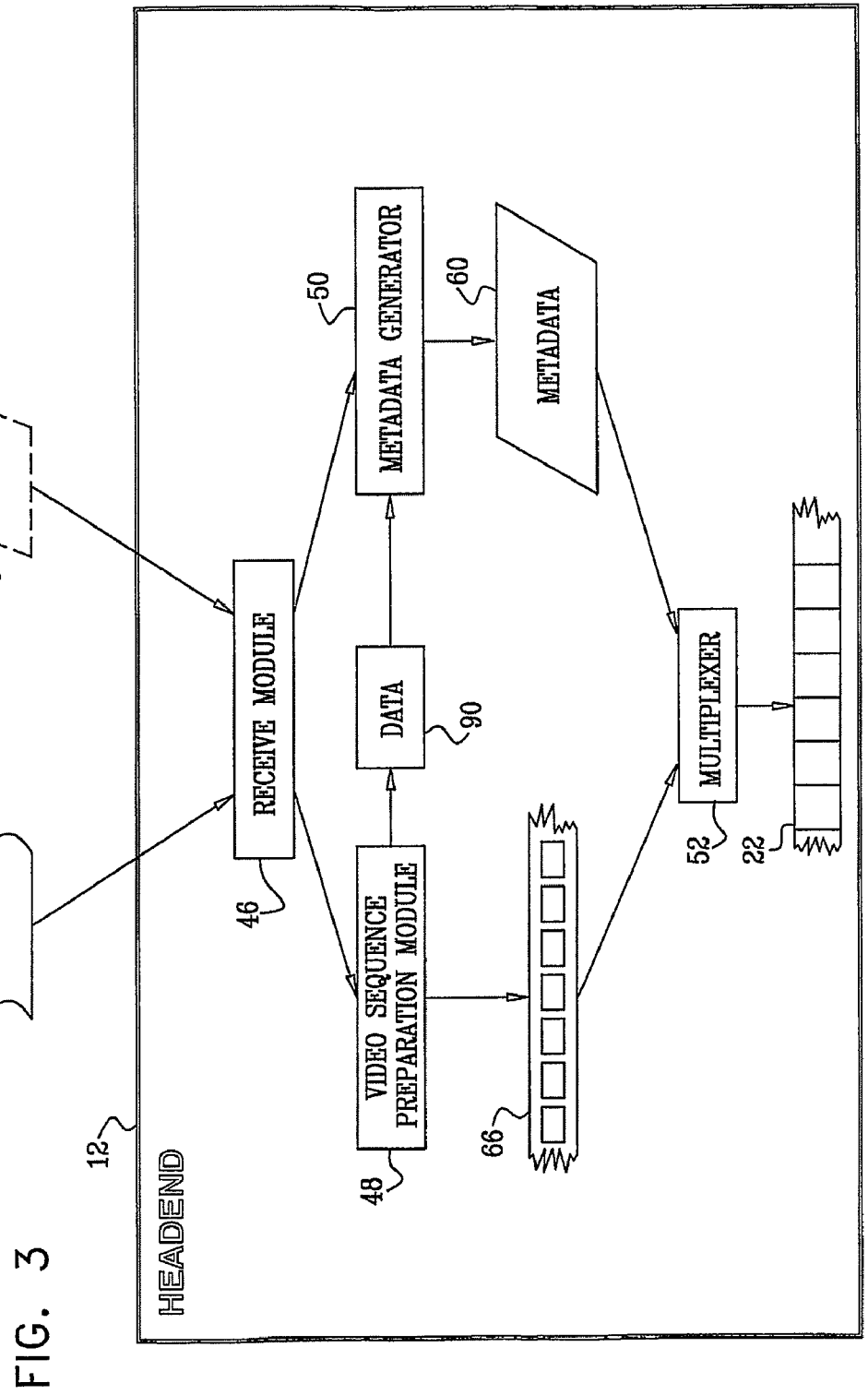
FIG. 3 is a partly pictorial, partly block diagram view of a Headend in the system of FIG. 1.

Reference is now made to FIG. 3, which is a partly pictorial, partly block diagram view of the Headend 12 in the system 10 of FIG. 1.

The program guide system 10, typically implemented at the Headend 12, preferably includes a plurality of operationally connected modules including a receive module 46, a video sequence preparation module 48, a metadata generator 50 and a multiplexer 52.

Figure 4:
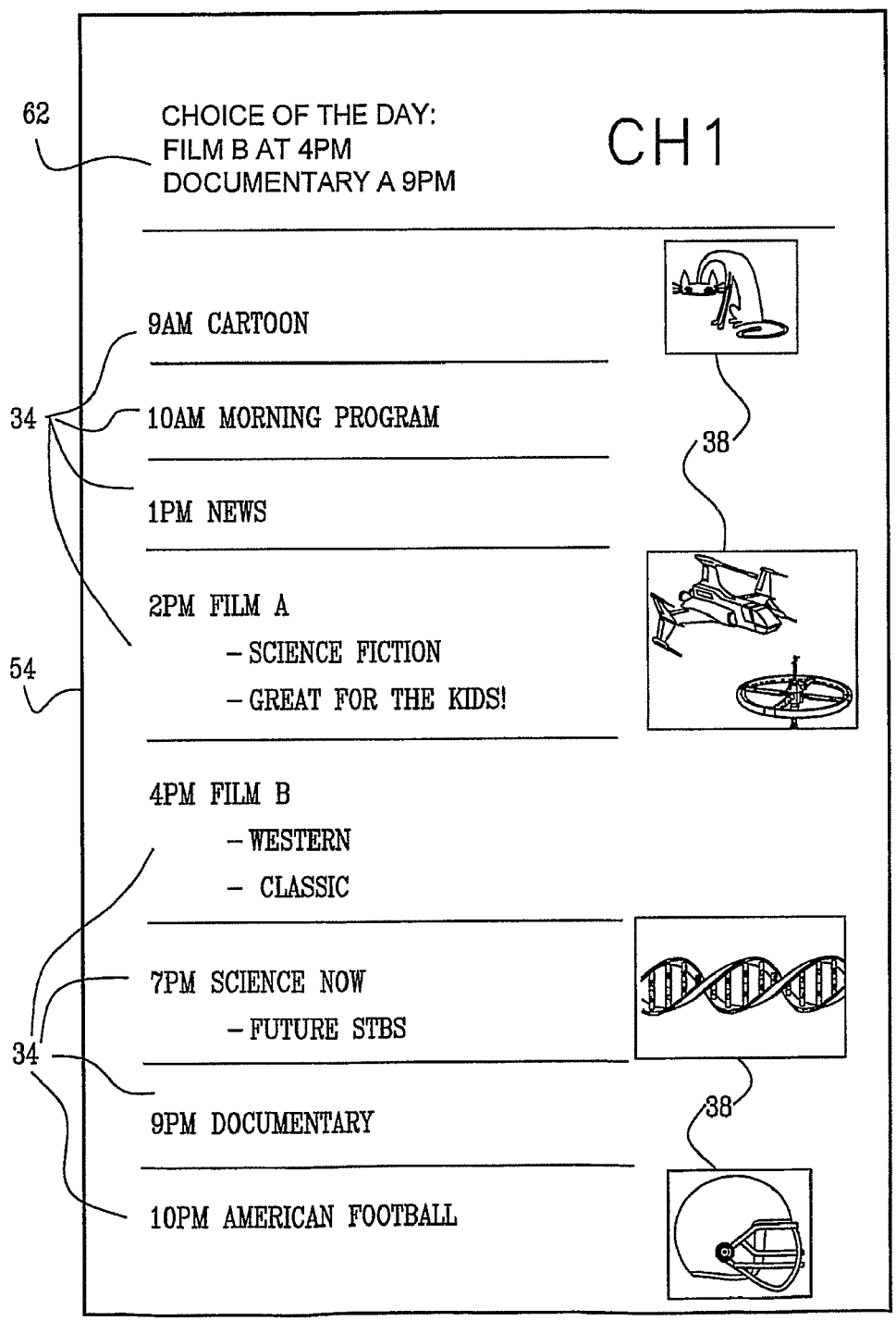
FIG. 4 is a view of a program list for use with the Headend of FIG. 3.
Figure 5:
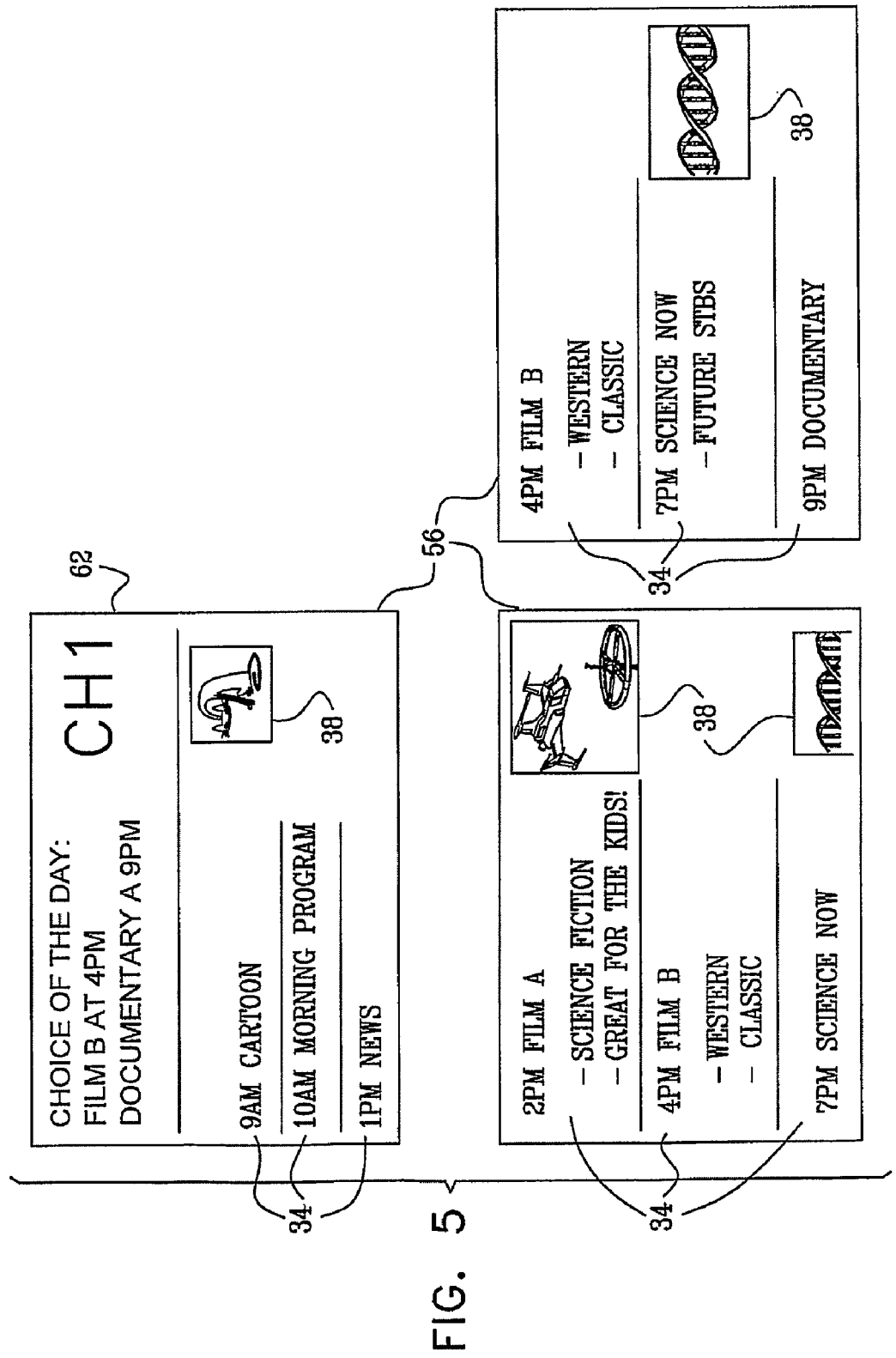
FIG. 5 is a view of a plurality of snapshots of the program list of FIG. 4.

Reference is now made to FIGS. 4 and 5. FIG. 4 is a view of a program list 54 for use with the Headend 12 of FIG. 3. FIG. 5 is a view of a plurality of snapshots 56 of the program list 54 of FIG. 4. Reference is also made to FIG. 3. It should be noted that only part of the program list 54 is shown in FIG. 4 for the sake of clarity.

An auto-generation tool (not shown) is preferably used to generate a graphic output based on: a list of the program items 34; program times; channels and days; synopsis data; and a format template. The graphic output is an intermediate file that a graphic designer can add images where appropriate, resize and reposition various parts. The final output produced by the graphic designer is the formatted program list 54. It will be appreciated by those ordinarily skilled in the art that the program list 54 may be produced entirely using the auto-generation tool or entirely by the graphic designer.

Additionally, a set of data 58 is also produced by the auto-generation tool. The data 58 typically includes the position of the program items 34 in the program list 54, channel and day boundaries in the program list 54 as well as the program times associated with the program items, among other items. The data is typically used by the metadata generator 50 to generate metadata 60, described in more detail below.

In accordance with an alternative preferred embodiment of the present invention, the data 58 is not produced at all. Instead, the metadata generator 50 prepares the metadata 60 based on: the input to the auto-generation tool; and analysis of the program list 54.

Additionally, in accordance with another alterative preferred embodiment of the present invention, the program list 54 is a list of unformatted data including the program items 34, program times, channels and days, synopsis data and pictorial representations. The unformatted data is then typically processed by the video sequence preparation module 48 based on a format template, thereby negating the need for the separate auto-generation tool and the graphic designer.

The receive module 46 is preferably operative to receive the program list 54. The program list 54 typically includes the program items 34 and associated pictorial representations 38.

Before the first program item 34 of the day, a section 62 which reviews the day's programming optionally appears. The font or color scheme, or a short cut may make it easier for the viewer 20 (FIG. 1) to by-pass the section 62, if required.

Figure 6:
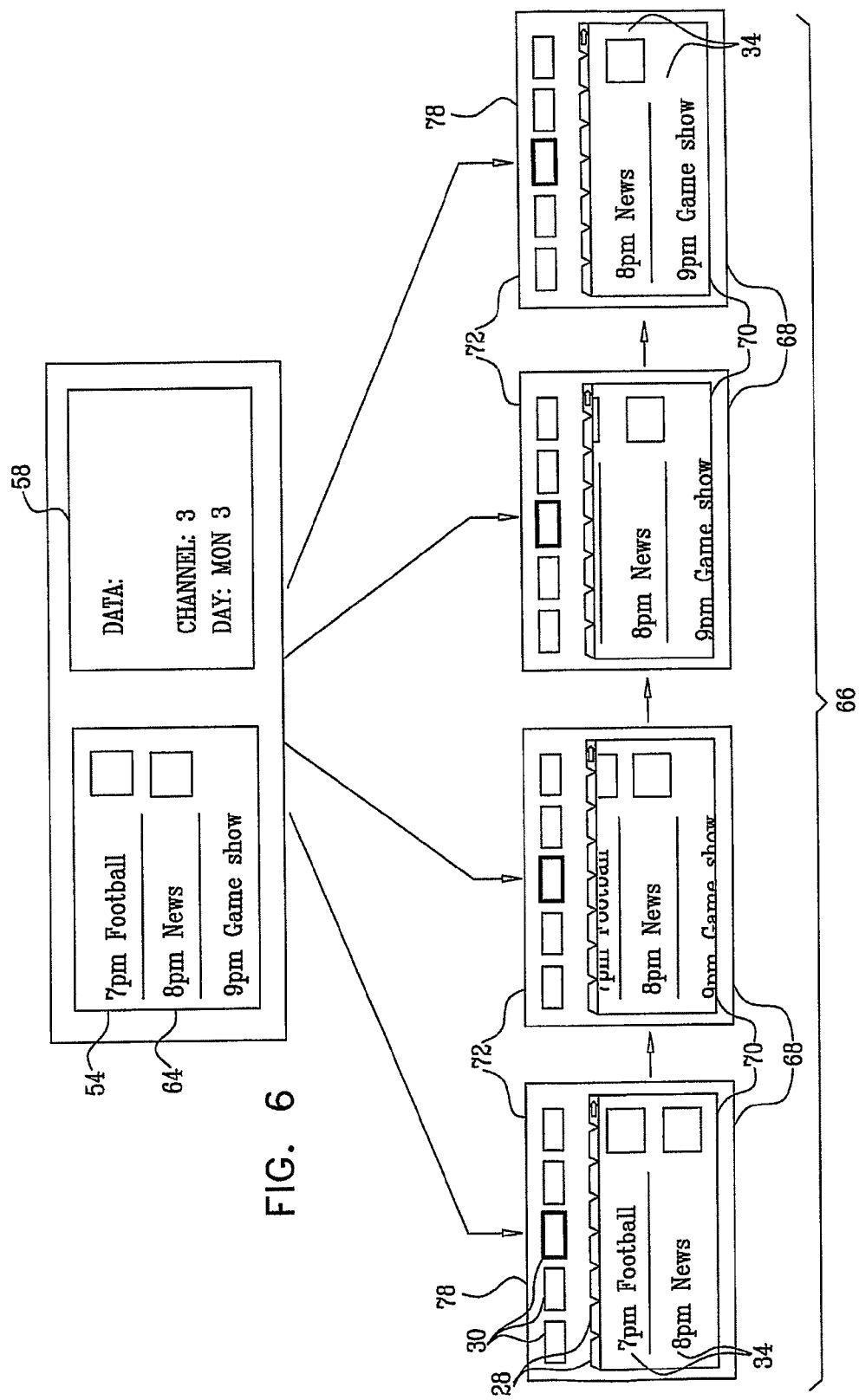
FIG. 6 is a partly pictorial, partly block diagram view showing preparation of a video sequence by the Headend of FIG. 3.

Reference is now made to FIG. 6, which is a partly pictorial, partly block diagram view showing preparation of a video sequence 66 by the Headend 12 of FIG. 3. Reference is also made to FIG. 3.

The video sequence preparation module 48 is preferably operative to receive the program list 54 and the data 58 from the receive module 46.

FIG. 6 shows a section 64 of the program list 54. It should be noted that the section 64 of the program list 54 is not shown in the part of the program list 54 shown in FIG. 4.

The video sequence preparation module 48 is preferably operative to prepare the video sequence 66. The video sequence 66 includes a plurality of video frames 68. Each of the video frames 68 preferably includes: a central section 70 corresponding to the scrolling window 32 of FIG. 2; and a surrounding section 72 which includes the tabs 28 and logos 30. The central section 70 generally includes at least one of the program items 34 from the program list 54 and/or the day review section 62 (FIG. 4). As the video frames 68 progress in the video sequence 66, the program items 34 progressively scroll in the section 70. As day and channel boundaries are reached, the tabs 28 and logos 30 are updated as required.

Therefore, the video sequence 66 produced by the video sequence preparation module 48 is generally based on: the program list 54; the data 58 (if used); and the size and position of the scrolling window 32 (FIG. 2) as well as the formatting for the tabs 28 and logos 30 (FIG. 2) optionally included in the data 58.

Generally, the video frames 68 are generated by the video sequence preparation module 48 such that playing the video sequence 66 by a rendering device (for example, but not limited to, one of the receivers 14) generates a video output showing scrolling of the program items 34 in the scrolling window 32 of the program guide screen 26 (FIG. 2).

The term "play", in a grammatical form thereof, as used in the specification and claims, is defined as playing the video sequence 66 in order in either a forward or reverse direction unless the term "play" is accompanied with another descriptor, for example, "play forward" or "playing in reverse".

Figure 11:
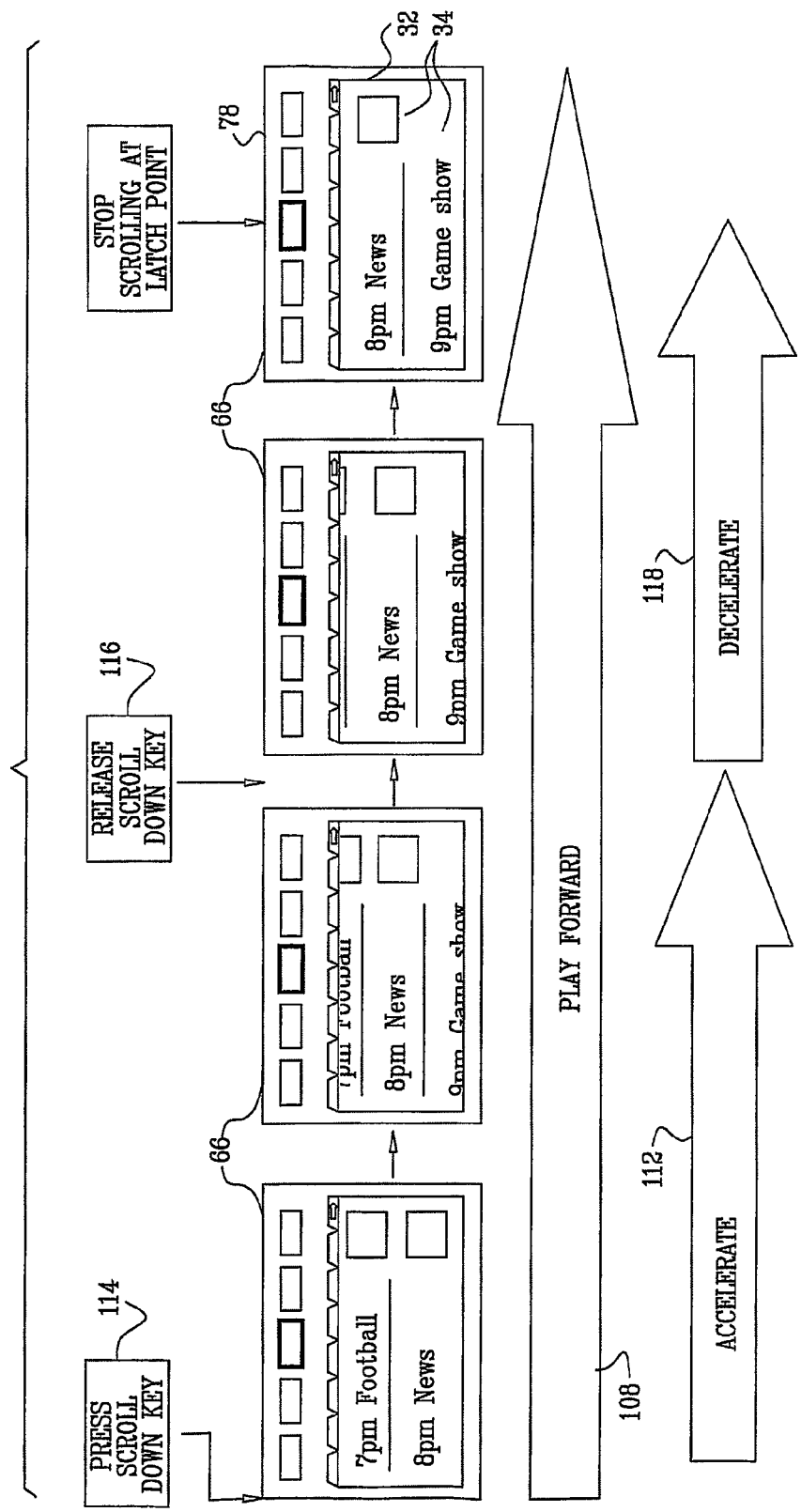
FIG. 11 is a partly pictorial, partly block diagram view showing forward rendering of the video sequence of FIG. 6 by the receiver of FIG. 10.
Figure 12:
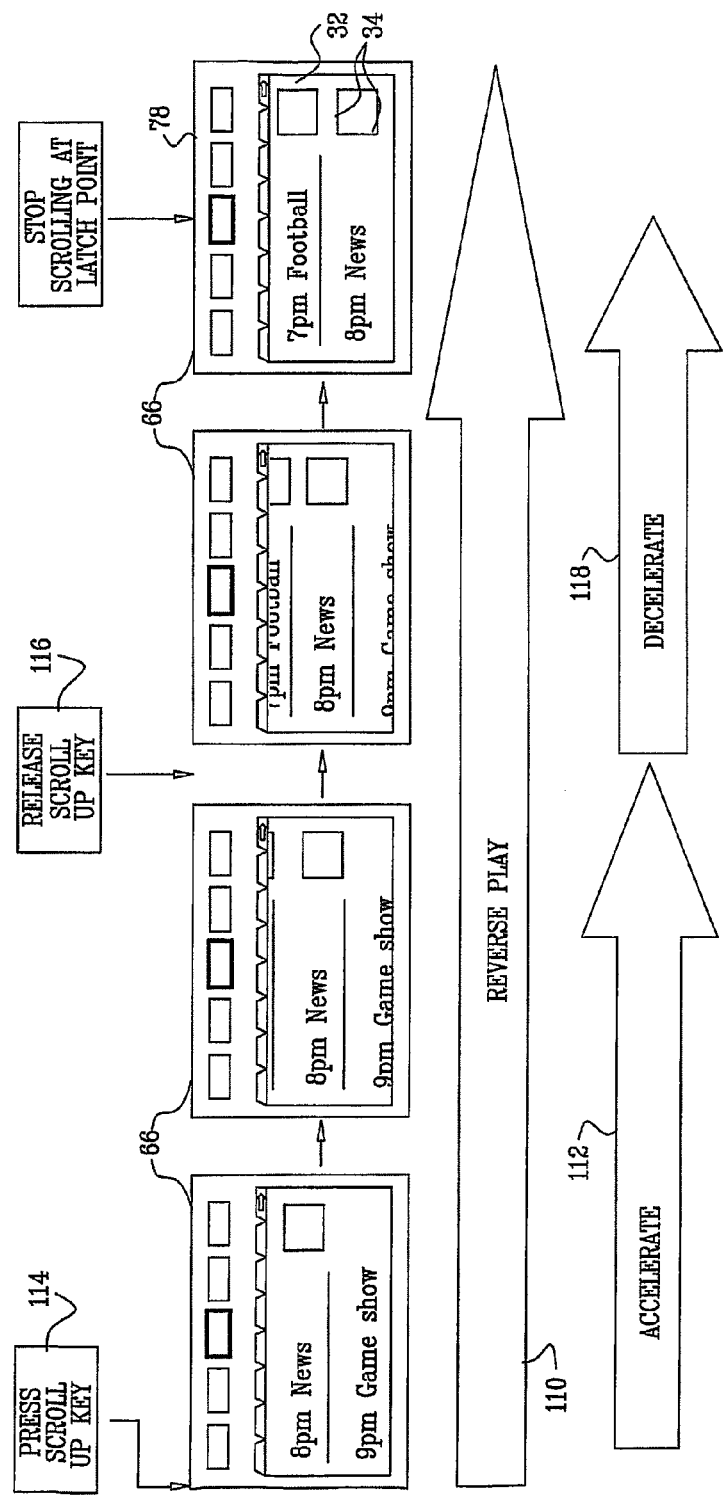
FIG. 12 is a partly pictorial, partly block diagram view showing reverse rendering of the video sequence of FIG. 6 by the receiver of FIG. 10.

Therefore, in general, the video sequence preparation module 48 is preferably operative to prepare the video sequence 66 such that: playing the video sequence 66 in a forward direction by a rendering device (the receiver 14 of FIG. 1) generates the video output showing scrolling of the program items 34 in one direction; and playing the video sequence 66 in a reverse direction by a rendering device generates the video output showing scrolling of the program items 34 in another direction (see FIGS. 11 and 12).

Reference is again made to FIGS. 2 and 3.

The metadata generator 50 is preferably operative to receive: data 90 from the video sequence preparation module 48; and the data 58 from the receive module 46 (when the data 58 is used). The data 90 from the video sequence preparation module 48 is necessary in order to link the timecodes of the video frames 68 (FIG. 6) to the metadata 60.

The metadata 60 is typically used for: navigation of the program guide 16; and disposing one or more indicators 74 showing the program items 34 that have been booked for recording.

Navigation of the program guide 16 based on the metadata 60 is described in more detail with reference to FIGS. 7-9.

The indicators 74 are typically superimposed over the output of the video sequence 66 as an on-screen display by the receivers 14 (FIG. 1). As the height allocated to the program items 34 may be different for different program items 34, it is necessary for the metadata 60 to include a height measurement 76 for each of the program items 34 in order to determine where to dispose the indicator(s) 74. If advertisements, or similar items, are inserted in the program list 54, the height of an advertisement is preferably appended to the program item 34 above the advertisement in order to simplify the calculation of placement of the indicator(s) 74. The indicators 74 are described in more detail with reference to FIGS. 9 and 10.

The video sequence 66 generally does not have any audio track since audio output of the audio track would be distorted when constantly changing speed and/or direction. Instead, an audio clip (which may also be included in the metadata 60) is preferably played separately in a loop, which is unaffected by the playback of video sequence 66.

Reference is again made to FIG. 6.

The metadata 60 also preferably indicates a plurality of scroll latch points 78 being the video frames 68 where a whole program item 34 is at the top of the program items 34 in the section 70 or scrolling window 32 (FIG. 2). The scroll latch points 78 are typically used to ensure that when scrolling stops, a whole program item 34 is always at the top of the program items 34.

Figure 7:
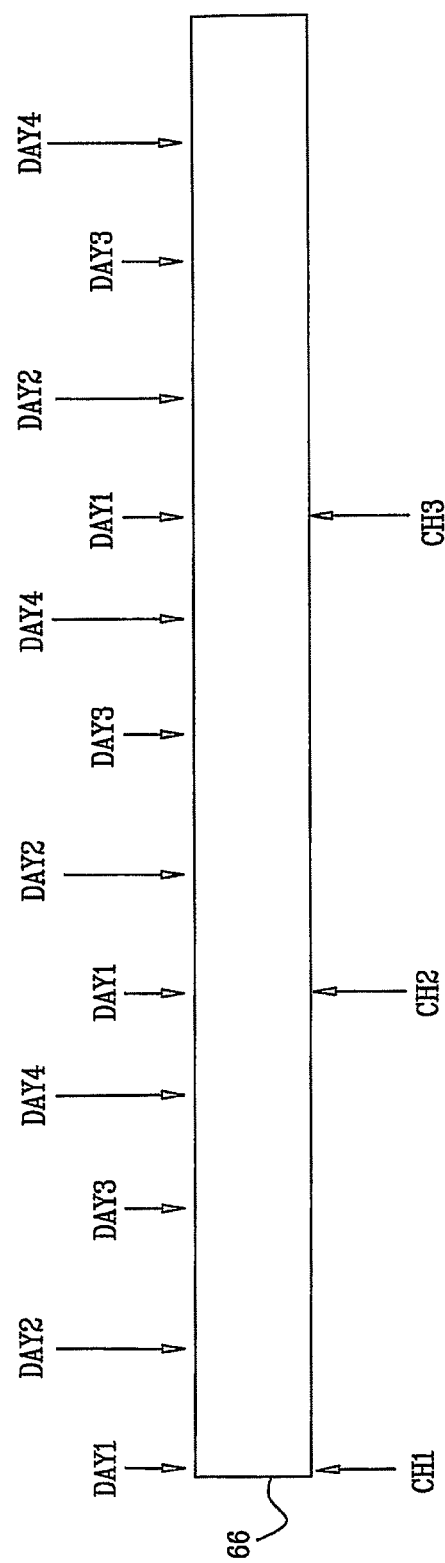
FIG. 7 is a view of a video sequence prepared by the Headend of FIG. 3.

Reference is now made to FIG. 7, which is a view of the video sequence 66 prepared by the Headend 12 of FIG. 3. Reference is also made to FIG. 2.

The video sequence 66 typically includes the program items 34 for a plurality channels (CH1, CH2, CH3, etc.) and a plurality of days (DAY1, DAY2, DAY3, DAY4, etc.) for each channel.

Navigation by the viewer 20 (FIG. 1) in the program guide 16 from one day to another day and from one channel to another channel, whilst keeping to approximately the same time of day, generally requires suitable entries in the metadata 60 (FIG. 3). In particular, the metadata 60 preferably includes data linking the video frames to: the program times (not shown), the channels (CH1, CH2, CH3, etc.), and the days (DAY1, DAY2, DAY3, DAY4, etc.).

The term "link" or "linking", as used in the specification and claims, is defined as a direct link or indirect link via one or more metadata elements.

Figure 8:
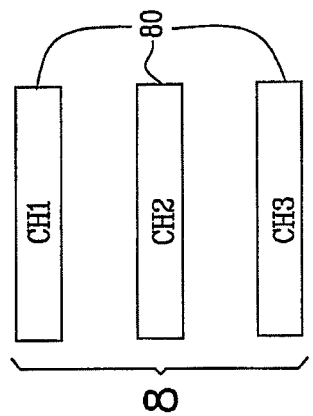
FIG. 8 is a view of a plurality of video sequences prepared by the Headend of FIG. 3.

Reference is now made to FIG. 8, which is a view of a plurality of video sequences 80 prepared by the Headend 12 of FIG. 3. Reference is also made to FIG. 2.

In accordance with an alternative preferred embodiment of the present invention, a separate video sequence 80 is uniquely associated with the program items 34 of each channel (CH1, CH2, CH3, etc.). Therefore, the metadata 60 (FIG. 3) preferably links each of the channels (CH1, CH2, CH3, etc.) to the appropriate video sequence 80.

Figure 9:
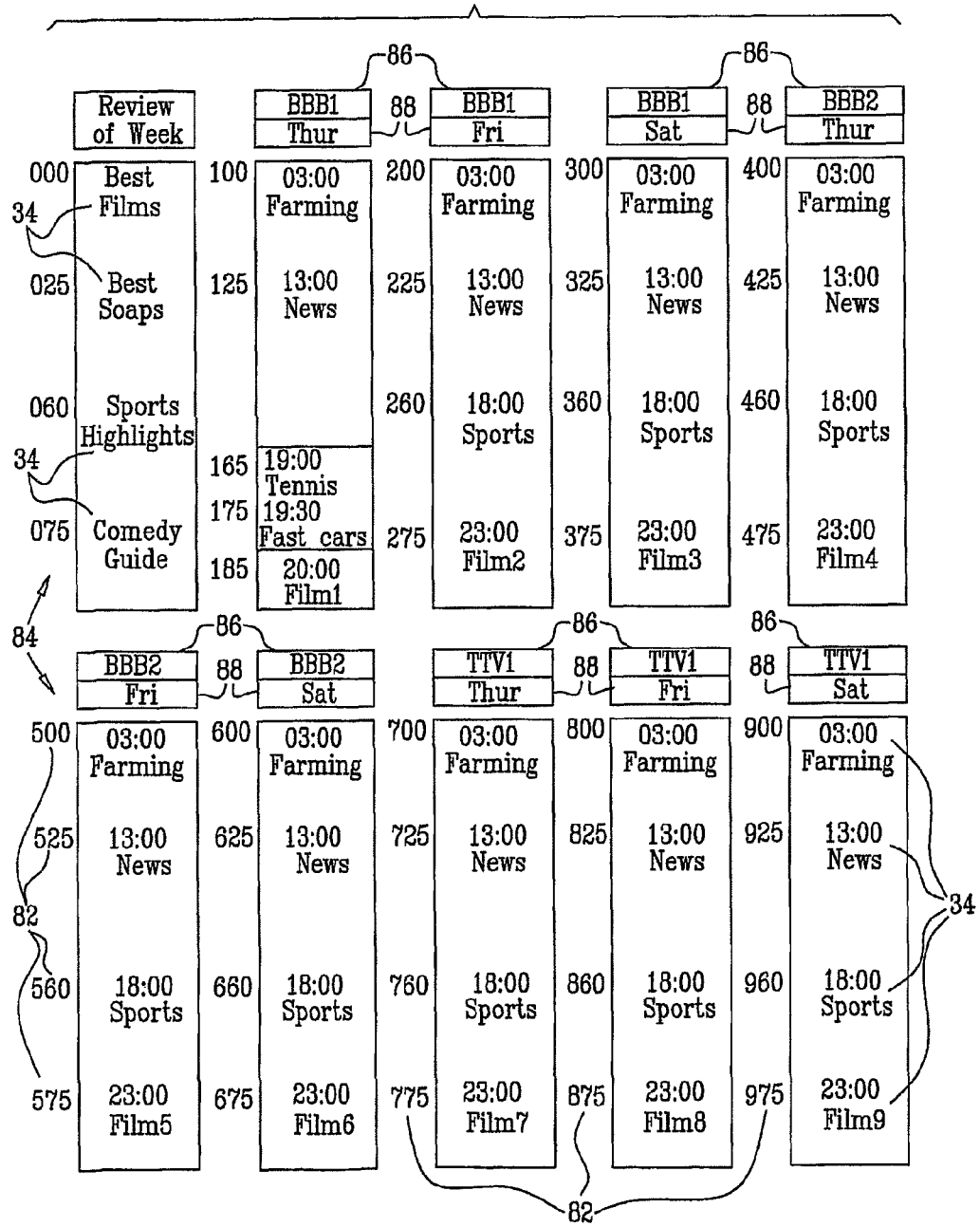
FIG. 9 is a view showing a video sequence with a plurality of program items having associated timecodes for use by the Headend of FIG. 3.

Reference is now made to FIG. 9, which is a view showing a video sequence 84 with the program items 34 having associated timecodes 82 for use by the Headend 12 of FIG. 3. The video sequence 84 is substantially the same as the video sequence 66 of FIG. 3 except that the video sequence 84 is prepared from a different program list than the program list 54 (FIG. 3).

The video sequence 84 includes three channels 86 (namely, BBB1, BBB2, TTV1) and three days 88 (namely, Thursday, Friday, Saturday), by way of example only.

The timecodes 82 are assigned by the video sequence preparation module 48 while the video sequence 84 is being prepared.

The format of the metadata 60 needs to be carefully defined, in order to enable determining which program items 34 are associated with a particular timecode 82 as well as the screen location of the program items 34, for example, but not limited to, to allow booking of a program item and showing booked events once the program items 34 have stopped scrolling. There is a trade-off between the graphic designer of the 'magazine' being completely free to put events anywhere (which typically relates to large quantity of metadata) and keeping events evenly spaced throughout (which typically relates to a smaller quantity of metadata). The trade-off is a design decision to be made at implementation time. The metadata 60 is attached to the video sequence 84 by including a data stream (not shown) with the video sequence 84.

Typically data elements included in the metadata 60 are shown in Table 1. The values in parenthesis are typical values based on the timecodes 82 and the program items 34 and channels shown in FIG. 9.

TABLE 1

The components of the metadata 60

| Item Number | Reference | Description |
|---|---|---|
| 1 | VERSION | Version of the metadata 60. |
| 2 | AUDIO_CLIP | Provides music while in the program guide 16. |

TABLE 1-continued

The components of the metadata 60

| Item Number | Reference | Description |
|---|---|---|
| 3 | NUM_CHANNELS | Number of channels in the program guide 16. (3) |
| 4 | CHAN_PROG_INDEX[ ] | index[NUM_CHANNELS] array of program item indices that represent the first program item to appear on each channel boundary. (0, 13, 25) = "Farming" in each case |
| 5 | NUM_DAYS | Number of days schedule in video clip. (3) |
| 6 | DAY_PROG_INDEX[ ] | index[NUM_DAYS] array of program item indices at day transitions. (0, 5, 9, 13, 17, 21, 25, 29, 33) |
| 7 | NUM_PROGS | Number of programs items (excluding review section). (37) |
| 8 | PROG_LATCH_TIMECODES[ ] | Timecodes[NUM_PROGS] array of scroll latch points to allow the video to come to rest with a whole program item 34 at the top. (100, 125, 165, 175, 185, 200, 225, . . . 960, 975) |
| 9 | PROG_HEIGHT_PIXELS[ ] | Pixels[NUM_PROGS] array of heights in units of pixels of the on-screen display (OSD) layer, for each program item 34. (150, 200, 150, 100 . . . ) |
| 10 | SCROLL_WINDOW_PIXELS | The position (x and y coordinates) and height in OSD layer pixels of the scrolling window 32 (FIG. 2). (x = 40, y = 175, h = 300) |
| 11 | HIGHLIGHT_ICON_OFFSET | A vector defining the position of the highlight icon (on-screen display 44 of FIG. 2) when the video is stopped and latched to a program item 34. The vector starts from the top left point of the SCROLL_WINDOW_PIXELS and continues to the top left coordinate of the highlight icon. (4, 24) |
| 12 | BOOKING_ICON_OFFSET | A vector from the top left point of the particular program item 34 to the top left coordinate of the booking icon (the indicator 74 of FIG. 2). (360, 4) |
| 13 | CHANNEL_ID[ ] | Channel_ID[NUM_CHANNELS] array of channel information allowing the channel to be identified by the channel number. (101, 102, 103) |
| 14 | PROG_TIMES[ ] | Time[NUM_PROGS] array of program times in time-date format for each program item 34 in the program guide 16. (03:00Thu, 13:00Thu, 19:00Thu, 19:30Thu, 20:00Thu, . . . ) |
| 15 | DAY_TIMES[ ] | Time[NUM_DAYS] array of times in date format for each of the separate date boundaries. (Thu, Fri, Sat) |
| 16 | PROGRAM_ID[ ] | Program_ID[NUM_PROGS] array of PROGRAM_IDs to verify the expected program has been selected (that the metadata 60 matches service information (SI) data). The PROGRAM_ID may be used to display an error screen for example. |

The following examples illustrate some of the use cases of the metadata 60 by the receivers 14 (FIG. 1).

In order to find the appropriate place to start the video sequence 84, the following steps may be performed. First, the current time and date, T are retrieved (say 19:05Thur). The current channel being viewed C, is determined (say "101"). CHANNEL_ID[ ] is looped through until a matching index with C is found (index position 1 is found). The index in CHAN_PROG_INDEX[ ] is used to obtain the first program on channel C (index 0 is found). Starting at the index 0, PROG_TIMES[ ] is looped through to find the index of the currently viewed program (index 2 is found having a value of "19:00Thu"). The timecode for the program index 2 is read using PROG_LATCH_TIMECODES[ ] giving a value of "165". The video sequence 84 is played in pause mode at timecode 165.

In order to stop at a scroll latch point, the following steps are generally performed. First, the viewer 20 (FIG. 1) releases the up or down key of the remote control 24 (FIG. 1) causing a key release event to be handled. The current timecode T is retrieved. PROG_LATCH_TIMECODES[ ] is iterated through to find the recently passed and next latch timecode. If the time code has only just passed a latch point, play is reversed to return to the "passed" timecode, otherwise play is continued to the next latch point. The definition of "just passed a latch point" is typically defined by the designer of the program guide 16, or the broadcast or the user, by way of example only. For example, if the program item 34 "just passed" has a height of 300 pixels including the title, the pictorial representation 38 and the synopsis 40, the title having a height of 50 pixels, then "just passed" the latch point is typically defined as within 50 pixels of the latch point, as it is generally assumed that the viewer 20 may stop pressing the up/down key while the title is partially displayed in the top 50 pixels of the scrolling window 32 and still expect the program guide system 10 to realize that the viewer 20 meant to stop on the "just passed" program item 34.

In order to jump forward a day to approximately the same time of day, the following steps are generally performed. First, the current timecode, T of the video sequence 84 is retrieved (say timecode 165). PROG_LATCH_TIME-CODES[ ] is iterated through to find the index of the nearest program to the highlight position (value "165" corresponds to the program item with index of 2). The time of the nearest program is obtained by passing the index into PROG_TIMES[ ] yielding "13:00Thur". DAY_PROG_INDEX[ ] is iterated through to find which day the nearest program represents (2 is between 0 and 5, so the day has an index of 0). The index is set to the start of the next day (index 1, with a value of 5). Starting at the index of 5, PROG_TIMES[ ] is iterated through to find the program on the next day that most closely has the same start time ("18:00Fri"). The index is set to the new value of 7. The 7th index is searched in PROG_LATCH_TIMECODES[ ] to obtain the required timecode, giving 260. Set the play position to timecode 260.

In order to jump forward a channel to approximately the same time of day, the following steps are performed. First, the current timecode T of the video sequence 84 is retrieved (say timecode 165). PROG_LATCH_TIMECODES[ ] is iterated through to find the index of the nearest program to the highlight position (value "165" corresponds to the program item with index of 2). The time of the nearest program is obtained by passing the index into PROG_TIMES[ ] yielding "13:00Thur". The channel index of the nearest program is obtained by looking at CHAN_PROG_INDEX[ ] (2 is between 0 and 13, so the channel has an index of 0). The index is set to the start of the next channel using CHAN_PROG_INDEX[ ] (index 1, with a value of 13). Starting at the index of 13, PROG_TIMES[ ] is iterated through to find the program scheduled at approximately the same time and day, ("18:00Thur" is the closest with an index of 15). The index is set to 15. Use the new index in PROG_LATCH_TIMECODES[ ], the required timecode is retrieved (index 13 yields a timecode of 460). The play position is set to the timecode of 460.

In order to add a highlight icon (the on-screen display 44 of FIG. 2) once the scrolling has stopped or when the program guide 16 is first run in pause mode, the following steps are preferably performed. The highlight icon position is determined as equal to the SCROLL_WINDOW_PIXELS vector plus the HIGHLIGHT_ICON_OFFSET vector. The on-screen display 44 is then disposed at the icon position.

In order to add a booking icon (the indicator 74 of FIG. 2), the following steps are performed. Whether the booking icon is added when the program guide 16 is first run or whether the booking icon is added after scrolling has stopped, the index from the PROG_LATCH_TIMECODES[ ] is known (say, n). The number of program items currently being displayed is determined. The index is looped from n to m, reading and summing PROG_HEIGHT_PIXELS[index] until the summed height is larger than the size of the scrolling window 32 (FIG. 2) given by h of SCROLL_WINDOW_PIXELS. Therefore, there are m-n+1 program items 34 currently on screen. For each program index (n to m) the channel associated with the program index is determined, by comparing the index with the channel changeover points in CHAN_PROG_INDEX[ ]. For each program index (n to m) the start time is obtained from PROG_TIMES[index]. It is determined if each program item (with index n to m) is booked based on the start time and channel. Alternatively, it is determined if each program item is booked based on the PROGRAM_ID. For the booked programs items 34, the booking icons are disposed on the scrolling window 32 (FIG. 2). By way of example, if there are 3 program items on the screen then the y coordinate of the booking icon for the $3^{rd}$ program item is given by: SCROLL_WINDOW_PIXELS+BOOKING_ICON_OFFSET+PROG_HEIGHT_PIXELS[n]+PROG_HEIGHT_PIXELS[n+1].

The above use cases describe "iterating arrays" for illustrative purposes only. It will be appreciated by those ordinarily skilled in the art that other suitable algorithms and binary chops may be used in order to maximize efficiency.

Reference is again made to FIG. 3.

The video sequence 66 and the metadata 60 are preferably multiplexed in to the transport stream 22 by the multiplexer 52.

The video sequence 66 and the metadata 60 are typically "pushed" from the Headend 12 to the receivers 14 (FIG. 1) via the transport stream 22 in substantially the same way that "interactive" content is sent to the receivers 14. In a DVB broadcast system, the transport stream 22 typically includes a DSM-CC carousel stream (not shown) for carrying the metadata 60 and a video stream (not shown) for carrying the video sequence 66. Specific receivers 14 or groups of receivers 14 may be targeted with specific versions of the video sequence 66, for example, but not limited to, depending on subscriber package or the capabilities of the receiver 14. The video sequence 66 and the metadata 60 are typically treated as a low priority booking by the receivers 14, with automatic rebooking after a conflict is encountered.

In a DVB environment, a PMT table (not shown), typically prepared by the Headend 12, preferably lists the component streams (the video stream and the DSM-CC carousel stream) needed for the program guide 16 so that both the DSMCC carousel and the video stream are recorded for the program guide 16 by the receivers 14. The start time and duration of the video sequence 66 are typically included in the event information schedule (EITSC) table. Every day (or whatever period is suitable for the business model), a new video sequence and associated metadata is pushed by the Headend 12 to the receivers 14. In practice, it may be possible to chop the first day off of the existing video sequence 66 at the receivers 14 and add a new day at the end of the video sequence 66.

Figure 10:
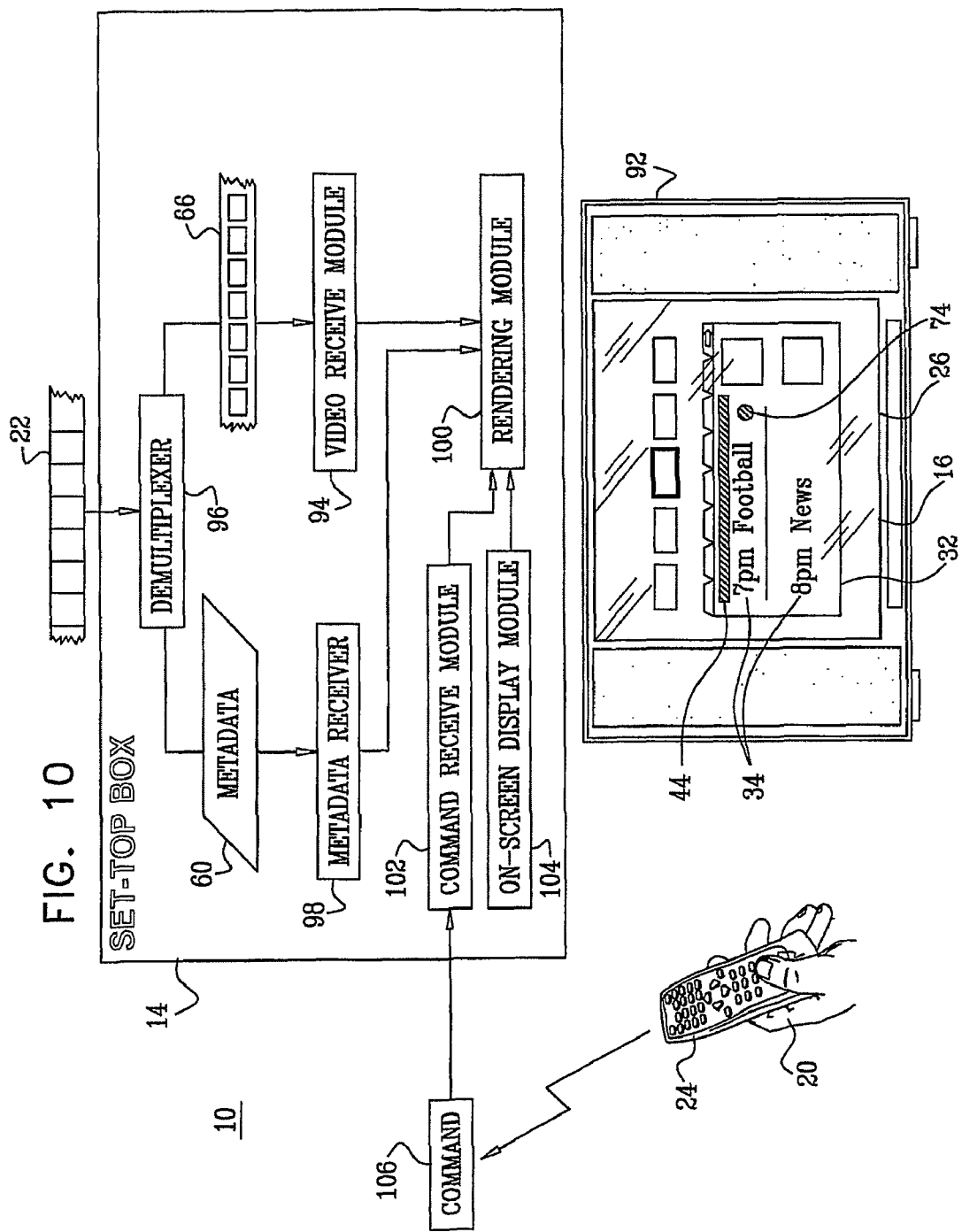
FIG. 10 is a partly pictorial, partly block diagram view of a receiver and display device in the system of FIG. 1.

Reference is now made to FIG. 10, which is a partly pictorial, partly block diagram view of the receiver 14 and a display device 92 in the system 10 of FIG. 1.

The program guide system 10 implemented in the receivers 14 typically includes a plurality of operationally connected modules preferably including a demultiplexer 96, a video receive module 94, a metadata receiver 98, a rendering module 100, a command receive module 102, and an on-screen display module 104.

The transport stream 22 is preferably received by the receiver 14 and processed by the demultiplexer 96 so that the constituent parts of the program guide 16 can be extracted, namely the metadata 60 and the video sequence 66 (or the video sequences 80 of FIG. 8 according to an alternative preferred embodiment of the present invention).

The metadata 60 is preferably received by the metadata receiver 98. The video sequence 66 is preferably received by the video receive module 94. The video receive module 94 typically stores the video sequence 66 on to the hard drive of the receiver 14. The metadata receiver 98 typically saves the metadata 60 on to the hard drive of the receiver 14. Once the video sequence 66 is on the hard drive of the receiver 14, the viewer 20 (FIG. 1) is generally not aware that the video sequence 66 has arrived. The video sequence 66 is typically transparent to the viewer 20.

The metadata 60 is preferably used for navigation of the program guide 16 and disposing an indicator (the indicator 74 or the on-screen display 44 of FIG. 2) on the program guide 16. The metadata 60 has been described in more detail with reference to FIGS. 7-9.

The command receive module 102 is preferably operative to receive a control command 106 from the viewer 20, via the remote control 24, to scroll the program items 34.

The rendering module 100 is preferably operative to play the video sequence 66, thereby generating video output showing the scrolling of the program items 34. When the program guide 16 is initially selected by the viewer 20, the rendering module 100 is preferably operative to play the video sequence 66 in pause mode.

The user interface of the program guide 16 is typically either incorporated into an existing user interface on the receiver 14 (for example, an existing Java user interface), or the user interface is run as an interactive application.

Reference is now made to FIGS. 11 and 12. FIG. 11 is a partly pictorial, partly block diagram view showing forward rendering of the video sequence 66 by the receiver 14 of FIG. 10. FIG. 12 is a partly pictorial, partly block diagram view showing reverse rendering of the video sequence 66 by the receiver 14 of FIG. 10. Reference is also made to FIG. 10.

By way of introduction, pressing the up/down keys (not shown) of the remote control 24 by the viewer 20 effects scrolling up and down, respectively, of the program items 34 on a particular channel. Preferably, the scrolling of the program items 34 appears to the viewer as smooth scrolling. After the up/down keys are released the video sequence 66 is typically brought to a smooth stop at the next scroll latch point 78 so that a whole one of the program items 34 is at the top of the program items 34 in the scrolling window 32. The video sequence 66 is then preferably played in paused mode.

Scrolling the program items 34 is now described in more detail below.

The command receive module 102 is preferably operative to receive an up/down scrolling command to scroll in an upward/downward direction, respectively. The rendering module 100 is preferably operative to play the video sequence in a forward direction 108 or reverse direction 110 on receipt of the down/up scrolling command, thereby generating the video output showing scrolling of the program items 34 in the downward/upward direction, respectively.

The rendering module 100 is preferably operative to adjust the play speed of the video sequence 66 during the scrolling such that the scrolling accelerates after a start (block 114) of the scrolling (arrow 112). The speed of scrolling typically increases to a maximum speed for comfortably scanning the program items 34 by the viewer 20.

When the up/down keys of the remote control 24 are released (block 116), and the up/down scrolling commands are no longer being received by the command receive module 102, the rendering module 100 prepares to end the scrolling at the next program item 34. The rendering module 100 is operative to adjust the play speed of the video sequence 66 such that the scrolling decelerates to a stop (arrow 118), resting at the next scroll latch point 78 of the next program item 34, based on the metadata 60 received by the metadata receiver 98.

Preferably, if the up/down keys are released just after passing the scroll latch point 78 of one of the program items 34, then the rendering module 100 plays back to the "passed" scroll latch point 78.

Pressing the up/down key of the remote control 24 and then immediately releasing the up/down key preferably scrolls to the next program item 34. When the up/down key is pressed and immediately released, the scrolling typically accelerates faster than when the up-down key is kept depressed. At approximately the middle of the next program item 34, the scroll speed typically starts decelerating and the scrolling rests in the correct place, at the scroll latch point 78 of the next program item 34.

Both the acceleration and deceleration is typically dependant on the height of the program items 34 in such a way that all program items 34 take the same time to scroll over to the next program item 34, so that the viewer 20 can therefore get into a rhythm when jumping from one program item 34 to the next. Having to wait longer to press a key after some program items 34 and not other program items 34 is an unpleasant user experience that is preferably avoided.

The scroll latch points 78 are preferably identified based on the metadata 60, described in detail with reference to FIG. 9.

A key is preferably assigned on the remote control 24 so that the viewer 20 can jump to the start of the program guide 16 where the review section 62 (FIG. 4) is located. Alternatively, the viewer 20 can scroll back to the top of the program guide 16 in order to view the review section 62. The section 62 may appear once at the very beginning of the program guide 16 or at the beginning of each day and/or each channel.

The rendering module 100 preferably includes a function for playing the video sequence 66 from one timecode with acceleration and then decelerating until another timecode. The function is typically implemented in any layer of the receiver 14 software, but preferably as close as possible to the hardware driver layer.

The program guide 16 may be designed such that the images in the scrolling window 32 are: wider when the top of the scrolling window 32 is close to a scroll latch point; and narrower away from the scroll latch points, so that the viewer 20 has a feeling when the scrolling is on, or near to, a scroll latch point.

Reference is again made to FIGS. 2 and 10.

Once the program items 34 have stopped scrolling, the top program item 34 is preferably highlighted with the on-screen display 44 by the on-screen display module 104. The position of the on-screen display 44 is based on the metadata 60, described in detail with reference to FIG. 9.

The viewer 20 may select the top program item 34, preferably highlighted with the on-screen display 44, in order to book the top program item 34 for recording by the receiver 14. The top program item is typically selected for booking by pressing a selection key (not shown) of the remote control 24. The Program_ID of the top program item 34 is typically used to identify the top program item 34 when booking programs to prevent errors occurring when the actual program schedule is different from the program schedule shown in the program guide 16. The receiver 14 then displays booking screens (not shown) in order to book the top program item 14. Once the top program item 34 is booked, the on-screen display module 104 is preferably operative to dispose the indicator 74 (by way of example only, a red dot or circle) on the program guide screen 26 showing that the top program item 34 has been booked. The position of the indicator 74 is based on the height of the program items 34 as described in detail with reference to FIG. 9.

The on-screen display module 104 may also be used to dispose other on-screen displays on the program guide screen 26, for example, but not limited to, graying-out program items 34 not in the subscription package of the viewer 20.

Reference is again made to FIGS. 2, 7 and 10.

The viewer 20 may jump from channel to channel in the program guide 16 typically using the channel up/down keys (not shown) of the remote control 24. The command receive module 102 is preferably operative to receive a channel change command 106 from the viewer 20 to select a new channel for viewing in the program guide 16. Preferably, the program guide 16 is restarted in the new channel at the same approximate time as shown in the program guide 16 for the previous channel. The metadata 60 links the channels and program times to the video frames 68 (FIG. 6) as described in detail with reference to FIG. 9. On receipt of the channel change command 106, the rendering module 100 is preferably operative to play the video sequence 66 from the video frame 68 indicated by the metadata as being associated with the new channel and at the same approximate time as shown in the program guide 16 for the previous channel.

The viewer 20 may jump from one day to another in the program guide 16 typically using the left/right keys (not shown) of the remote control 24. The command receive module 102 is preferably operative to receive a day change command 106 from the viewer 20 to select a new day for viewing in the program guide 16. Preferably, the program guide 16 is restarted in the new day at the same approximate time as shown in the program guide 16 for the previous day. The metadata 60 links the days and program times to the video frames 68 (FIG. 6) as described in detail with reference to FIG. 9. On receipt of the day change command 106, the rendering module 100 is preferably operative to play the video sequence 66 from the video frame 68 indicated by the metadata as being associated with the new day and at the same approximate time as shown in the program guide 16 for the previous day.

Reference is again made to FIGS. 2, 8 and 10.

When the transport stream 22 includes the video sequences 80, such that each of the video sequences 80 is uniquely associated with one of the channels of the program guide 16, the video receive module 94 is preferably operative to receive the video sequences 80. The metadata 60 links the channels to an associated one of the video sequences 80. On receipt of the channel change command, the rendering module is preferably operative to start playing another of the video sequences 80 indicated by the metadata 60 as being associated with the new channel on receipt of the channel change command.

Some of the advantages of the program guide system 10 are listed below.

First, the broadcaster can offer more information to the viewer 20 without forcing the viewer 20 to read, or be stuck on, pages of information that are not of interest, since the viewer 20 can skim-read past the fast moving text that is not of interest without feeling stuck on the 'wrong menu' and arrive at the place of interest with ease.

Second, fonts and graphics of the program guide 16 can be completely changed whenever a new video sequence 66 is produced. Furthermore, the inclusion of large bitmaps (such as a big image of a film) generally incurs no further software memory, no additional SI (Service Information) data elements, no scrolling speed cost, and no software design changes. At festive times, such as Christmas and Easter, the look and feel of the program guide 16 can suddenly change to the appropriate graphical treatment.

There are many possible implementation models of the program guide system 10. For example, multiple video clips may be created, one for each subscription package. The video clips can then be pushed selectively to the right receivers 14, allowing the program guide 16 to contain principally information on programs related to the subscriber's package with toned down information on non-package programs for advertising purposes. A different implementation model might have one video clip for all subscribers to aid simplicity of implementation. Alternatively, one video clip could be produced per channel (described with reference to FIG. 8) to allow the receivers 14 to display only the appropriate channels for a specific viewer, based on the favorites of the viewer 20 or parental control rules, for example.

Figure 13:
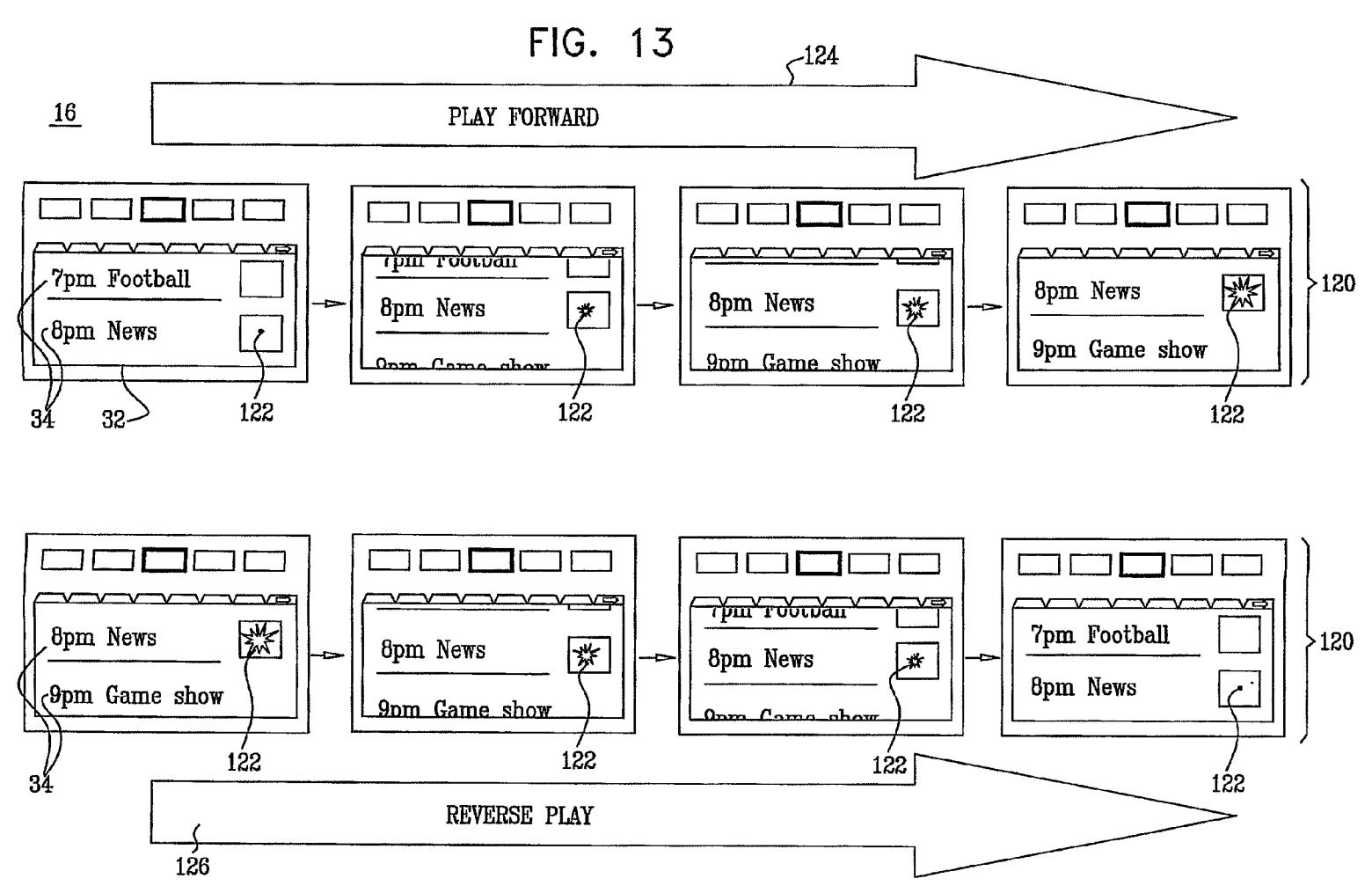

Reference is now made to FIG. 13, which is a partly pictorial, partly block diagram view showing rendering of a video sequence 120 of the program guide 16 including an element 122 in motion by the receiver 14 of FIG. 10.

Rather than just having a still pictorial representation appearing with one of the program items 34 in the program guide 16, a short video clip with movement (for example, but not limited to, a person winking and/or dancing) may be added to the program guide 16 so that as the program guide 16 is scrolled up and down, the pictorial representation of the program item 34 moves, thereby further interesting the viewer 20 (FIG. 1).

The start and end points of the video clip are preferably the same so that the video clip loops smoothly.

When the program guide 16 is locked on a scroll latch point, the pictorial representation shown is typically the preferred image in the sequence, such as the person not currently in a wink, or the start of the little dance.

A problem with using video clips for the pictorial representations is now described below.

FIG. 13 shows the video sequence 120 being played in a forward direction (arrow 124). As the program items 34 scroll down, the element 122 in motion develops from a dot into an expanding explosion. However, when the video sequence 120 is played in reverse (arrow 126), corresponding to the program items 34 scrolling down, the element 122 in motion starts out as a large explosion which contracts to a dot.

Therefore, it is preferable to limit the video clips to time-symmetrical movements.

A system and method to allow movement of an element in motion without requiring time-symmetrical movements is now described below.

Figure 14:
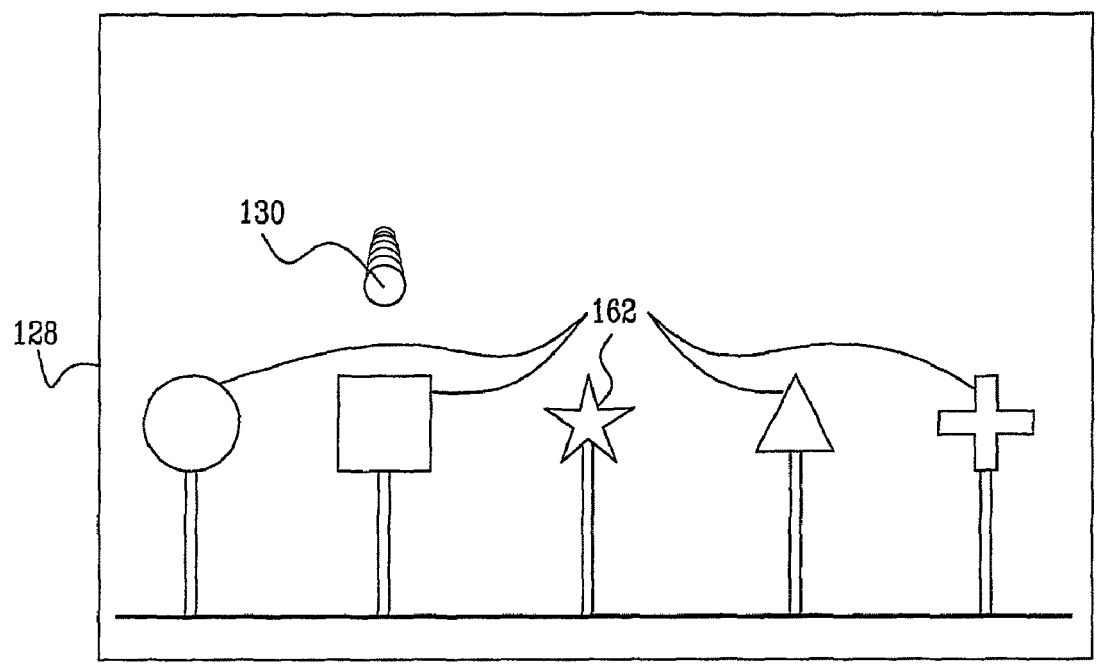
FIG. 14 is a view of a scene including an element in motion.

Reference is now made to FIG. 14, which is a view of a scene 128 including an element 130 in motion.

Some applications are based on scrolling or panning through content. In such applications it is a common need to change the direction of the scrolling under viewer control, for example: the program guide system 10 of FIGS. 1-13; and a side-on shooter or platform game which may include panning through a scene to both the left and right.

In a similar fashion to the program guide system 10, a single video sequence can be produced which can be played forward and in reverse in order to simulate scrolling up and down or panning left and right, depending on the application. The term "scrolling", and all grammatical forms thereof, as is used in the specification and claims, is defined as scrolling up and down and/or panning left and right, or scrolling in any two or more directions. Smooth reverse play is common to many PVR implementations. When the content includes elements with motion, the above method does not produce satisfactory results, as described with reference to FIG. 13.

Consider panning through the scene 128 that includes a ball (the element 130) and a plurality of differently shaped sign posts 162. The ball drops above the sign post 162 closest to the center of the part of the scene 128 being viewed. If the scene 128 is rendered in video stored on a PVR then forward play creates a pan to the right with the ball 130 dropping. However, playing the same single video sequence backwards will create a pan to the left but with the ball 130 rising.

Figure 15:
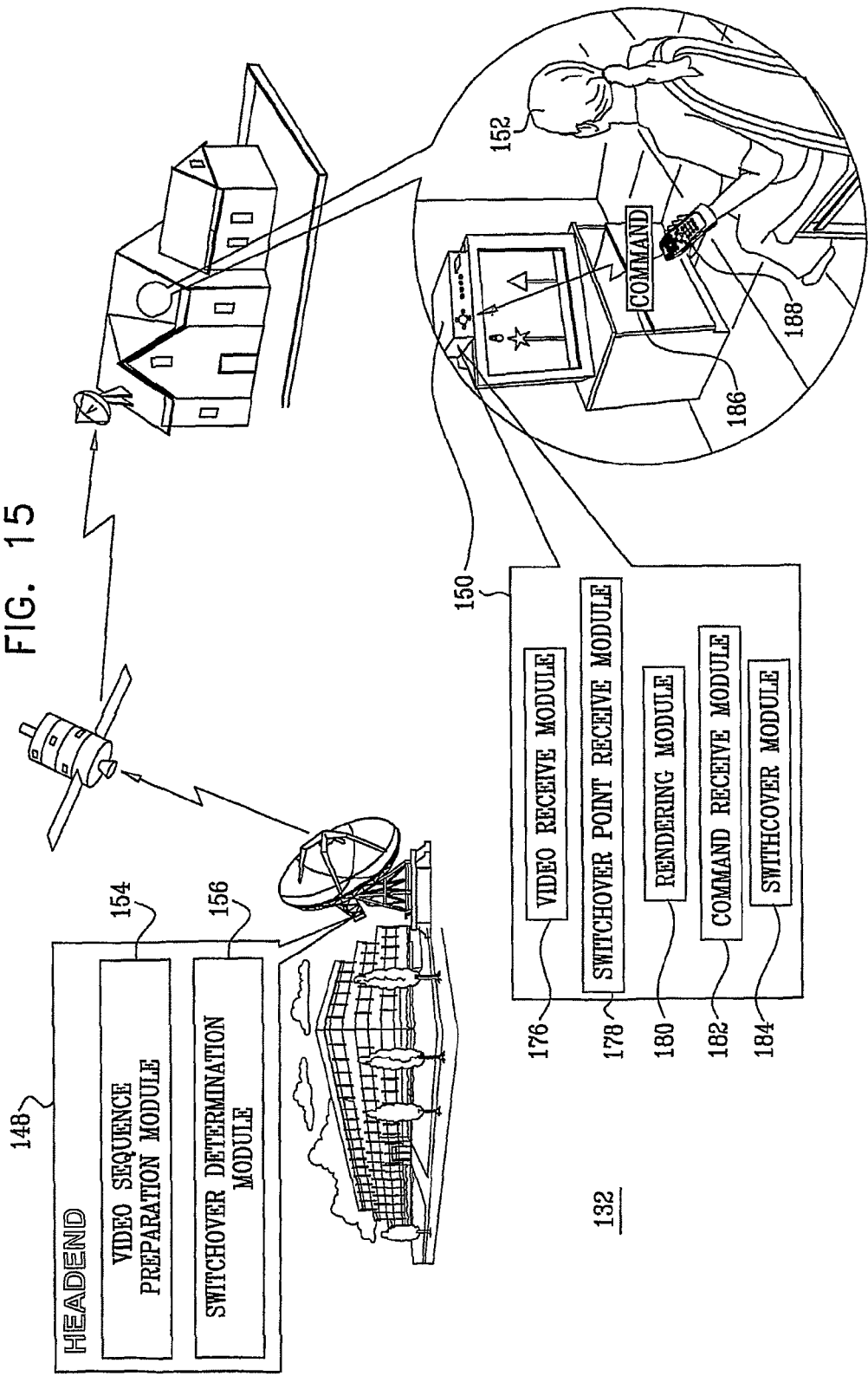
FIG. 15 is a partly pictorial, partly block diagram view of a scrolling system constructed and operative in accordance with a preferred embodiment of the present invention.
Figure 16:
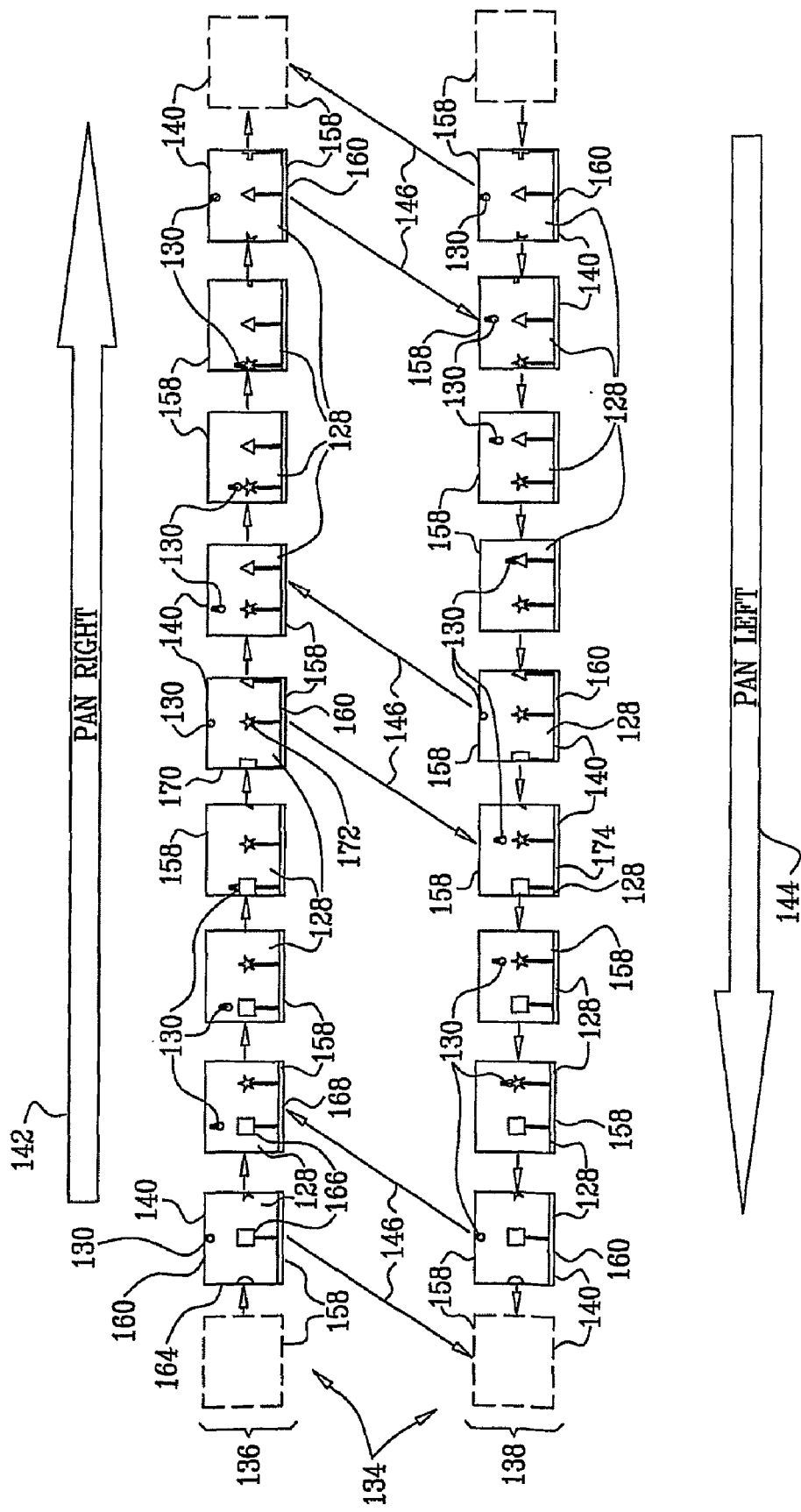
FIG. 16 is a view of a plurality of video sequences of the system of FIG. 15.

Reference is now made to FIGS. 15 and 16. FIG. 15 is a partly pictorial, partly block diagram view of a scrolling system 132 constructed and operative in accordance with a preferred embodiment of the present invention. FIG. 16 is a view of a plurality of video sequences 134 of the system 132 of FIG. 15.

The scrolling system 132 is preferably operative to: prepare data; and create video-based applications that are typically graphically-rich. The application preferably includes scrolling content 128 in at least two directions 142, 144 while maintaining correct movement of the elements 130 in motion in the content 128 even when the direction of scrolling is changed or stopped.

By way of introduction, the scrolling system 132 prepares the video sequences 134 including a video sequence 136 and a video sequence 138. In the video sequence 136, the motion of the elements 130 in the scene 128 is correct for the panning to the right (arrow 142). In the video sequence 138, the motion of the elements 120 in the scene 128 is correct for the panning to the left (arrow 144). The two video sequences should be preferably carefully authored with a plurality of switchover points 140, where switching between the sequences 134 and hence in pan direction can occur preferably without any visible glitch in the independent motion of elements 130 within the scene 128. A plurality of arrows 146 show the direction of switchover between the video sequences 134. Additionally, data is preferably made available that identifies the switchover points 140.

The video sequence 136 (shown as an ordered sequence from left to right in FIG. 16) shows movement through the scene 128 panning to the right. The element 130 gradually drops over one of the sign posts 162. Once the element 130 has reached the sign post 162, the element 130 is then positioned over the next sign post 162 on the right. The element 130 then progressively drops over the next sign post 162. The element 130 drops while the scene 128 is being panned to the right.

Similarly, the video sequence 138 (shown as an ordered sequence from right to left in FIG. 16) shows movement through the scene 128, but to the left. The element 130 gradually drops over the sign posts 162 but while moving to the left.

If a viewer 152 is scrolling to the right and then decides to scroll to the left, or vice-versa, a change in direction can take place at one of the switchover points 140 in accordance with the arrows 146. It can be seen that the viewer 152 can switch between the video sequence 136 and the video sequence 138 in order to scroll right and left, respectively, while the content as viewed by the viewer 152 appears to be continuous. For example, there are no jumps in the scene 128 when changing direction. Additionally, the motion of the element 130 as viewed by the viewer 152, even when changing direction, appears to be the same. For example, the element 130 is still dropping (and not rising) and is still dropping over the same sign post 162 (and not another sign post).

The scrolling system 132 is now described in more detail.

The scrolling system 132 is typically divided into two sections: a section at a broadcaster's Headend 148 or at the content provider; and a section in a plurality of receivers 150. The receivers 150 are typically PVRs.

At the Headend 148, the scrolling system 132 preferably includes a system for preparing: data including the switchover points 140; and the video sequences 134, in order to enable the viewer 152 to scroll the content (the scene 128) in a plurality of directions including the direction 142 and the direction 144. The content (scene 128) typically includes the element 130 in motion. The system at the Headend 148 preferably includes a plurality of operationally connected modules including: a video sequence preparation module 154 and a switchover determination module 156.

The video sequence preparation module 154 is preferably operative to prepare the video sequences 134 including the video sequence 136 and the video sequence 138. Each of the video sequences 134 preferably includes a plurality of still images 158. Each of the still images 158 typically includes part of the content (scene 128). At least some of the still images 158 include the element 130. The video sequence 136 is typically associated with scrolling in the direction 142. The video sequence 138 is typically associated with scrolling in the direction 144. The video sequence 138 are generally prepared such that playing the video sequence 136 and the video sequence 138 produces a video output showing scrolling the content in the direction 142 and the direction 144, respectively.

The switchover determination module 156 is preferably operative to prepare the data including the corresponding switchover points 140 in the video sequences 134 for switching between the video sequences 134 and therefore for switching the direction of scrolling by the viewer 152.

In accordance with a most preferred embodiment of the present invention, the video sequence preparation module 154 is operative to prepare the video sequences 134 such that some of the still images 158 of the video sequence 136 are the same as some of the still images 158 of the video sequence 138. Therefore, the video sequence 136 and the video sequence 138 have a plurality of common still images 160. Apart from the common still images 160, the other still images 158 in each of the video sequences 136, 138 are generally different due to the element 130 in motion in the scene 128.

The switchover determination module 156 is preferably operative to define the switchover points 140 as being at, or next to, the common still images 160. The term "next to", as used in the specification and claims, is defined herein as being before, or after, a frame in a video sequence according to a logical sequence of the video, for example, but not limited to, according to timecodes of the still images 158 in the video sequences 134.

The video sequences 134 and the switchover points 140 are preferably prepared such that even during switching the direction of scrolling, the content as viewed by the viewer 152 appears to be continuous.

The video sequences 134 and the switchover points 140 are preferably prepared such that, whether the scrolling is in the direction 142 or the direction 144, the motion of the element 130 as viewed by the viewer 152 appears to be the same, for example, the ball is always falling while scrolling in both directions (and not rising in the direction 142 and falling in the direction 144).

The author of the video sequences 134 should be aware of the constraint that the motion within the content generally places on the location of the switchover points 140.

In games, where the motion of objects in a scene may be repetitive, for example, the element 130 in the scene 128, the switchover points 140 are optionally defined according to a repetition of the motion of the element 130.

In program guides, for example, but not limited to, the program guide 16 of FIG. 2, the content includes the program items 34. The switchover determination module 156 is preferably operative to define the switchover points 140 according to the scroll latch points 78 (FIG. 6), for example, but not limited to, having a video clip start and end at the scroll latch points 78.

It will be appreciated by those ordinarily skilled in the art that the scrolling system 132 may be configured to provide scrolling for any suitable content including one or more elements 130. The element 130 is shown as a ball, but it will be appreciated by those ordinarily skilled in the art that the element 130 can take any shape or form and may even change over time, for example, but not limited to, an explosion or other suitable animation or video clip and/or a looped video preview of a program item in a program guide.

An example of navigation of the video sequences 134 is described below.

Starting on the left hand side of the video sequence 136, a frame 164 is shown, centered on a square signpost 166 with the ball 130 starting to drop onto the signpost 166. If we follow the arrow 142 to a next frame 168, the view has panned to the right of the scene 128, so that the square signpost 166 has moved to the left in the frame 168. The ball 130 has also dropped closer to the square signpost 166. Following the arrow 142 to the right, the right panning continues and the ball 130 continues to drop, until a frame 170 is reached, the frame 170 having a star signpost 172 in the centre of the frame 170, with a new ball 130 starting to drop on the star signpost 172. At the frame 170, which is also one of the switchover points 140, panning can continue to follow the direction 142 to the right while the new ball 130 falls towards the star signpost 172. Alternately, panning can change to the left (arrow 144) with the new ball 130 falling towards the star signpost 172, by switching over to the video sequence 138 (see the arrow 146 between the frame 170 and a frame 174).

The scrolling system 132 implemented hi the receiver 150 is now described in more detail.

At the receivers 150, the scrolling system 132 preferably includes a system for enabling the viewer 152 to scroll the content (the scene element 130, by way of example only) in a plurality of directions including the directions 142, 144. The system at the receiver 150 preferably includes a plurality of operationally connected modules including: a video receive module 176, a switchover point receive module 178, a rendering module 180, a command receive module 182, and a switchover module 184.

The video receive module 176 is preferably operative to receive the video sequences 134.

The switchover point receive module 178 is preferably operative to receive the switchover points 140.

The command receive module 182 is preferably operative to receive a control command 186 from a remote control 188 operated by the viewer 152 to scroll in the direction 142.

The rendering module 180 is preferably operative to play the video sequence 136 upon receipt of the control command 186.

The command receive module 182 is preferably operative to receive another control command 186 from the viewer 152 to scroll in the direction 144.

The switchover module 184 is preferably operative to: find the next switchover point 140 for exiting the video sequence 136, upon receipt of the other control command 186; find the corresponding switchover point 140 in the video sequence 138; and instruct the rendering module 180 to switch from playing the video sequence 136 to the video sequence 138 based on the found switchover points 140.

Reference is now made to FIG. 17, which is a view of the video sequences 134 of FIG. 16 disposed in a video stream 190.

The video sequence preparation module 154 (FIG. 15) is preferably operative to prepare the video stream 190 including a plurality of video frames 192 associated with a plurality of timecodes 194, each of the video frames 192 including one of the still images 158 (FIG. 16) of the video sequences 134. The switchover determination module 156 is preferably operative to define the switchover points 140 with reference to the timecodes 194 of the video frames 192.

Reference is now made to FIG. 18, which is a view of the video sequences 134 of FIG. 16 being down-sampled prior to being disposed into a video stream 196.

The video sequences 134 can be spatially combined via downsampling into a set of frames 198. The video sequence preparation module 154 (FIG. 15) is preferably operative to prepare the video stream 196 including the video frames 198, each of the video frames 198 including more than one of the still images 158.

Upon playback by the rendering module 180 (FIG. 15) a windowed region of the video representing one of the sequences 134 (FIG. 16) is up-sampled and presented to the viewer 152. At the switchover points 140 (FIG. 16) the up-sample window can be switched to the other video sequence 134 (FIG. 16) and the direction of playback reversed.

It will be appreciated by those ordinarily skilled in the art that an additional video sequence(s) may be produced so that scrolling through the content may be paused while still showing motion of the element(s) in the "paused" content. It will be appreciated by those ordinarily skilled in the art that an additional video sequence(s) may be produced so that the content can be scrolled at different speeds.

It is appreciated that software components of the present invention may, if desired, be implemented in ROM (read only memory) form. The software components may, generally, be implemented in hardware, if desired, using conventional techniques. It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

The present invention can be implemented in dedicated hardware, using a programmable digital controller suitably programmed, or using a combination of hardware and software.

Alternatively, the present invention can be implemented by software or programmable computing apparatus. This includes any computer, including PDAs personal digital assistants), mobile phones, etc. The code for each process in the methods according to the invention may be modular, or may be arranged in an alternative way to perform the same function. The methods and apparatus according to the invention are applicable to any computer with a network connection.

Thus the present invention encompasses a carrier medium carrying machine readable instructions or computer code for controlling a programmable controller, computer or number of computers as the apparatus of the invention. The carrier medium can comprise any storage medium such as a floppy disk, CD ROM, DVD ROM, hard disk, magnetic tape, or programmable memory device, or a transient medium such as an electrical, optical, microwave, RF, electromagnetic, magnetic or acoustical signal. An example of such a signal is an encoded signal carrying a computer code over a communications network, e.g. a TCP/IP signal carrying computer code over an IP network such as the Internet, an intranet, or a local area network.

While the invention has been described in terms of what are at present its preferred embodiments, it will be apparent to those skilled in the art that various changes can be made to the preferred embodiments without departing from the scope of the invention, which is defined by the claims.

What is claimed is:

1. A system for preparing data and a plurality of video sequences to enable a viewer to scroll content in a plurality of directions including a first direction and a second direction, the content including at least one element in motion, the system comprising a plurality of operationally connected modules including:
   a video sequence preparation module to prepare the video sequences including a first video sequence and a second video sequence, each of the video sequences including a plurality of still images, each of the still images including at least part of the content, at least some of the still images including the at least one element, the video sequences being prepared such that playing the first video sequence and the second video sequence effects scrolling the content in the first direction and the second direction, respectively; and
   a switchover determination module to prepare the data including a plurality of corresponding switchover points in the video sequences for switching between the video sequences and therefore for switching the direction of scrolling by the viewer, wherein:
   the video sequences and the switchover points are prepared such that: even during the switching of the direction of scrolling, the content as viewed by the viewer appears to be continuous; whether the scrolling is in the first direction or the second direction, the motion of the at least one element as viewed by the viewer appears to be the same; and even when the scrolling is paused, the at least one element appears to be in motion;
   the switchover determination module is operative to define the switchover points according to a repetition of the motion of the at least one element;
   the content includes at least part of a program guide, the content including a plurality of program items, the switchover determination module being operative to define the switchover points according to a plurality of scroll latch points, the scroll latch points being where the scrolling of the content comes to rest such that a whole one of the program items is at the top of the program items as viewed by the viewer;
   the at least one element in motion is an animation or preview for one of the program items; and
   the video sequence preparation module is operative to prepare the video sequences such that some of the still images of the first video sequence are the same as some of the still images of the second video sequence, the switchover determination module being operative to define the switchover points being at, or next to, the still images common to the first video sequence and the second video sequence.

2. A system for preparing data and a plurality of video sequences to enable a viewer to scroll content in a plurality of directions including a first direction and a second direction, the content including at least one element in motion, the system comprising a plurality of operationally connected modules including:
   a video sequence preparation module to prepare the video sequences including a first video sequence and a second video sequence, each of the video sequences including a plurality of still images, each of the still images including at least part of the content, at least some of the still images including the at least one element, the video sequences being prepared such that playing the first video sequence and the second video sequence effects scrolling the content in the first direction and the second direction, respectively; and
   a switchover determination module to prepare the data including a plurality of corresponding switchover points in the video sequences for switching between the video sequences and therefore for switching the direction of scrolling by the viewer.

3. The system according to claim 2, wherein the video sequences and the switchover points are prepared such that even during the switching of the direction of scrolling, the content as viewed by the viewer appears to be continuous.

4. The system according to claim 2, wherein the video sequences and the switchover points are prepared such that, whether the scrolling is in the first direction or the second direction, the motion of the at least one element as viewed by the viewer appears to be the same.

5. The system according to claim 2, wherein the switchover determination module is operative to define the switchover points according to a repetition of the motion of the at least one element.

6. The system according to claim 2, wherein the video sequences and the switchover points are prepared such that even when the scrolling is paused, the at least one element appears to be in motion.

7. The system according to claim 2, wherein the content includes at least part of a program guide, the content including a plurality of program items, the switchover determination module being operative to define the switchover points according to a plurality of scroll latch points, the scroll latch points being where the scrolling of the content comes to rest such that a whole one of the program items is at the top of the program items as viewed by the viewer.

8. The system according to claim 7, wherein the at least one element in motion is an animation or preview for one of the program items.

9. The system according to claim 2, wherein the video sequence preparation module is operative to prepare a video stream including a plurality of video frames associated with a plurality of timecodes, each of the video frames including one of the still images of the video sequences, the switchover determination module being operative to define the switchover points with reference to the timecodes of the video frames.

10. The system according to claim 2, wherein the video sequence preparation module is operative to prepare a video stream including a plurality of video frames, each of the video frames including more than one of the still images.

11. The system according to claim 2, wherein the video sequence preparation module is operative to prepare the video sequences such that some of the still images of the first video sequence are the same as some of the still images of the second video sequence, the switchover determination module being operative to define the switchover points being at, or next to, the still images common to the first video sequence and the second video sequence.

12. A system for enabling a viewer to scroll content in a plurality of directions including a first direction and a second direction, the content including at least one element in motion, the system comprising a plurality of operationally connected modules including:

a video receive module to receive a plurality of video sequences including a first video sequence and a second video sequence, each of the video sequences including a plurality of still images, each of the still images including at least part of the content, at least some of the still images including the at least one element, the first video sequence being associated with scrolling in the first direction, the second video sequence being associated with scrolling in the second direction;

a switchover point receive module to receive a plurality of corresponding switchover points in the video sequences for switching between the video sequences and therefore for switching the direction of scrolling;

a command receive module to receive a control command from the viewer to scroll in the first direction;

a rendering module to play the first video sequence upon receipt of the control command, the command receive module being operative to receive another control command from the viewer to scroll in the second direction; and a switchover module to: find a next one of the switchover points for exiting the first video sequence upon receipt of the other control command; find the corresponding one of the switchover points in the second video sequence; and instruct the rendering module to switch from playing the first video sequence to the second video sequence based on the found switchover points.

13. The system according to claim 12, wherein the video sequences are prepared and the switchover points are defined such that even during the switching of the direction of scrolling, the content as viewed by the viewer appears to be continuous.

14. The system according to claim 12, wherein the video sequences and the switchover points are prepared such that, whether the scrolling is in the first direction or the second direction, the motion of the at least one element as viewed by the viewer appears to be the same.

15. The system according to claim 12, wherein the switchover points are defined according to a repetition of the motion of the at least one element.

16. The system according to claim 12, wherein the video sequences and the switchover points are prepared such that even when the scrolling is paused, the at least one element appears to be in motion.

17. The system according to claim 12, wherein the content includes at least part of a program guide, the content including a plurality of program items, the switchover points being defined according to a plurality of scroll latch points, the scroll latch points being where the scrolling of the content comes to rest such that a whole one of the program items is at the top of the program items viewed by the viewer.

18. The system according to claim 17, wherein the at least one element in motion is an animation or preview associates with one of the program items.

19. The system according to claim 12, wherein the video receive module is operative to receive a video stream including a plurality of video frames associated with a plurality of timecodes, each of the video frames including one of the still images of the video sequences, the switchover points being defined with reference to the timecodes of the video frames.

20. The system according to claim 12, wherein the video receive module is operative to receive a video stream including a plurality of video frames, each of the video frames including more than one of the still images, the rendering module being operative to upsample the still images upon rendering.

21. The system according to claim 12, wherein some of the still images of the first video sequence are the same as some of the still images of the second video sequence, the switchover points being at, or next to, the still images common to the first video sequence and the second video sequence.

22. A method for preparing data and a plurality of video sequences to enable a viewer to scroll content in a plurality of directions including a first direction and a second direction, the content including at least one element in motion, the method comprising:

preparing the video sequences including a first video sequence and a second video sequence, each of the video sequences including a plurality of still images, each of the still images including at least part of the content, at least some of the still images including the at least one element, the video sequences being prepared such that playing the first video sequence and the second video sequence effects scrolling the content in the first direction and the second direction, respectively; and preparing the data including a plurality of corresponding switchover points in the video sequences for switching between the video sequences and therefore for switching the direction of scrolling by the viewer.

23. A method for enabling a viewer to scroll content in a plurality of directions including a first direction and a second direction, the content including at least one element in motion, the method comprising:

receiving a plurality of video sequences including a first video sequence and a second video sequence, each of the video sequences including a plurality of still images, each of the still images including at least part of the content, at least some of the still images including the at least one element, the first video sequence being associated with scrolling in the first direction, the second video sequence being associated with scrolling in the second direction;

receiving a plurality of corresponding switchover points in the video sequences for switching between the video sequences and therefore for switching the direction of scrolling;

receiving a control command from the viewer to scroll in the first direction;

playing the first video sequence upon receipt of the control command;

receiving another control command from the viewer to scroll in the second direction;

finding a next one of the switchover points for exiting the first video sequence upon receipt of the other control command;

finding the corresponding one of the switchover points in the second video sequence; and instructing the rendering module to switch from playing the first video sequence to the second video sequence based on the found switchover points.

24. A system for preparing data and a plurality of video sequences to enable a viewer to scroll content in a plurality of directions including a first direction and a second direction, the content including at least one element in motion, the system comprising a plurality of operationally connected modules including:

means for preparing the video sequences including a first video sequence and a second video sequence, each of the video sequences including a plurality of still images, each of the still images including at least part of the content, at least some of the still images including the at least one element, the video sequences being prepared such that playing the first video sequence and the second video sequence effects scrolling the content in the first direction and the second direction, respectively; and means for preparing the data including a plurality of corresponding switchover points in the video sequences for switching between the video sequences and therefore for switching the direction of scrolling by the viewer.

25. A system for enabling a viewer to scroll content in a plurality of directions including a first direction and a second direction, the content including at least one element in motion, the system comprising a plurality of operationally connected modules including: means for receiving a plurality of video sequences including a first video sequence and a second video sequence, each of the video sequences including a plurality of still images, each of the still images including at least part of the content, at least some of the still images including the at least one element, the first video sequence being associated with scrolling in the first direction, the second video sequence being associated with scrolling in the second direction;

means for receiving a plurality of corresponding switchover points in the video sequences for switching between the video sequences and therefore for switching the direction of scrolling;

means for receiving a control command from the viewer to scroll in the first direction;

means for playing the first video sequence upon receipt of the control command, the means for receiving the control command being operative to receive another control command from the viewer to scroll in the second direction;

means for finding: a next one of the switchover points for exiting the first video sequence upon receipt of the other control command; and finding the corresponding one of the switchover points in the second video sequence; and means for instructing the means for playing to switch from playing the first video sequence to the second video sequence based on the found switchover points.

* * * * *